US008917318B2

(12) United States Patent
Tomizawa et al.

(10) Patent No.: US 8,917,318 B2
(45) Date of Patent: Dec. 23, 2014

(54) SHOOTING APPARATUS AND SHOOTING CONTROL METHOD

(71) Applicant: Olympus Imaging Corp., Shibuya-ku, Tokyo (JP)

(72) Inventors: Masaomi Tomizawa, Hachioji (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 14/139,595

(22) Filed: Dec. 23, 2013

(65) Prior Publication Data
US 2014/0111624 A1  Apr. 24, 2014

Related U.S. Application Data

(63) Continuation of application No. 12/717,777, filed on Mar. 4, 2010, now Pat. No. 8,638,357.

(30) Foreign Application Priority Data

Mar. 9, 2009  (JP) .................................. 2009-055287

(51) Int. Cl.
H04N 13/00 (2006.01)
H04N 15/00 (2006.01)
H04N 13/02 (2006.01)
G03B 35/08 (2006.01)
G03B 17/18 (2006.01)

(52) U.S. Cl.
CPC ....... *H04N 13/0203* (2013.01); *H04N 13/0239* (2013.01); *H04N 13/0296* (2013.01); *G03B 35/08* (2013.01); *G03B 17/18* (2013.01)

USPC ............................................... 348/47; 348/42

(58) Field of Classification Search
CPC .......... H04N 13/0203; H04N 13/0239; H04N 13/0296; G03B 35/08; G03B 17/18
USPC ................. 348/42, 47, 239, 333.01; 382/154; 396/104, 325

See application file for complete search history.

(56) References Cited

U.S. PATENT DOCUMENTS

| 5,130,735 A * | 7/1992 | Kusaka et al. ................. 396/104 |
| 7,221,395 B2 * | 5/2007 | Kinjo .............................. 348/239 |
| 2002/0176016 A1 * | 11/2002 | Misawa et al. ........... 348/333.01 |
| 2007/0147827 A1 * | 6/2007 | Sheynman et al. ........... 396/325 |
| 2007/0189599 A1 * | 8/2007 | Ryu et al. ...................... 382/154 |

* cited by examiner

Primary Examiner — Allen Wong
(74) Attorney, Agent, or Firm — John C. Pokotylo; Straub & Pokotylo

(57) ABSTRACT

A shooting apparatus has an image pickup section, a display section which displays an image picked up by the image pickup section, an operation section for performing operations including a shooting command, a communication section which performs communication with a further shooting apparatus, a determination section which determines a left-right placement relationship between the shooting apparatus and the further shooting apparatus from a predetermined position held by the user with a right hand or a left hand or from a predetermined operation, and a control section which, by transmitting a signal to the further shooting apparatus through the communication section, performs control for causing at least a portion of an image picked up by the further shooting apparatus to be transmitted from the further shooting apparatus.

19 Claims, 20 Drawing Sheets

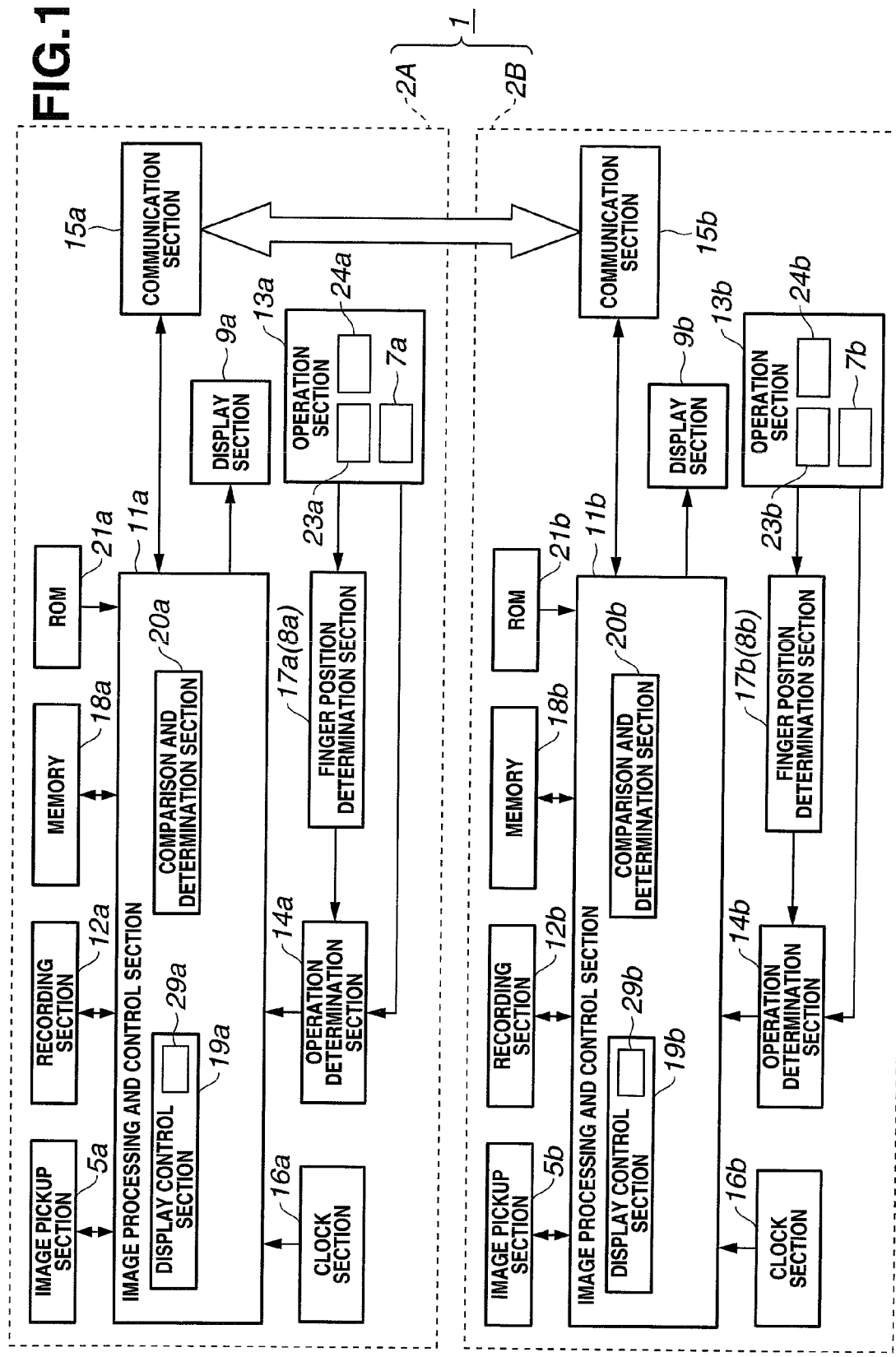

SHOOTING APPARATUS AND SHOOTING CONTROL METHOD

This application is a continuation application of U.S. patent application Ser. No. 12/717,777 (referred to as "the '777 application" and incorporated herein by reference), filed on Mar. 4, 2010, titled "SHOOTING APPARATUS AND SHOOTING CONTROL METHOD" and listing Masaomi TOMIZAWA and Osamu NONAKA as the inventors, the '777 application claiming benefit of Japanese Application No. 2009-055287 filed in Japan on Mar. 9, 2009, the contents of which are incorporated by this reference.

BACKGROUND OF THE INVENTION

1. Field of the Invention

The present invention relates to a shooting apparatus and a shooting control method for obtaining a three-dimensional image on the basis of images shot from a plurality of different viewpoints.

2. Description of the Related Art

A technique for shooting a three-dimensionally displayable still or moving image (three-dimensional image) by shooting one subject from a plurality of viewpoints is known.

As a method of shooting a three-dimensional image, a method of performing shooting from a plurality of viewpoints while moving one camera through a predetermined distance, for example, as disclosed in the publication of Japanese Patent No. 3722498 is known.

Also, as a method of shooting a three-dimensional image, a method of performing shooting with a camera having two image pickup lenses disposed at a predetermined distance from each other and a method of performing shooting with two cameras fixed in a state of being disposed at a predetermined distance from each other are known.

Also, with the development of image processing techniques for producing a three-dimensional image and display apparatuses for displaying a three-dimensional image, it is becoming possible for a user to easily appreciate a three-dimensional image in the same way as in appreciating an ordinary still or moving image.

In the technique for shooting a three-dimensional image as disclosed in the publication of Japanese Patent No. 3722498 mentioned above, shooting is performed from a plurality of viewpoints while moving one camera.

SUMMARY OF THE INVENTION

According to one aspect of the present invention, there is provided a shooting apparatus including an image pickup section which performs image pickup, a display section which displays an image picked up by the image pickup section, an operation section through which a user performs operations including a shooting command, a communication section which performs communication with a further shooting apparatus, a determination section which determines a left-right placement relationship between the shooting apparatus and the further shooting apparatus from a predetermined position held by the user with a right hand or a left hand or from a predetermined operation, and a control section which, by transmitting a signal to the further shooting apparatus through the communication section, performs control for causing at least a portion of an image picked up by the further shooting apparatus to be transmitted from the further shooting apparatus.

According to another aspect of the present invention, there is provided a shooting apparatus including an image pickup section which performs image pickup, a display section which displays an image picked up by the image pickup section, an operation section through which a user performs operations including a shooting command, a communication section which performs communication with a further shooting apparatus, a determination section which determines a left-right placement relationship between the shooting apparatus and the further shooting apparatus from a predetermined position held by the user with a right hand or a left hand or from a predetermined operation, and a display control section which, by considering the left-right placement relationship, displays on the display section at least a portion of an image picked up by the further shooting apparatus and received from the further shooting apparatus through the communication section and the image picked up by the shooting apparatus so that three-dimensional shooting can be checked.

According to the present invention, there is also provided a shooting control method in which a user holds at least one of two shooting apparatuses by user's two hands to perform three-dimensional shooting, the method including a first step of determining a left-right placement relationship between one of the hand-held shooting apparatuses and the other of the shooting apparatuses from a predetermined position at the time of the user holding the shooting apparatus by one of the user's two hands or from a predetermined operation by the one of the user's two hands, a second step of transmitting from the one of the two shooting apparatuses to the other of the shooting apparatuses a first signal for causing an image to be transmitted, a third step of receiving an image transmitted from the other of the shooting apparatuses, and a fourth step of displaying two images: an image picked up by the one of the shooting apparatuses and an image picked up by the other of the shooting apparatuses according to a result of determination of the left-right placement relationship so that an effect of three-dimensional shooting of the two images is improved in terms of visibility.

BRIEF DESCRIPTION OF THE DRAWINGS

FIG. 1C is a block diagram showing the configuration of a shooting system provided with Embodiment 1 of the present invention;

DETAILED DESCRIPTION OF THE PREFERRED EMBODIMENTS

Embodiments of the present invention will be described with reference to the accompanying drawings.

Figure 1A:
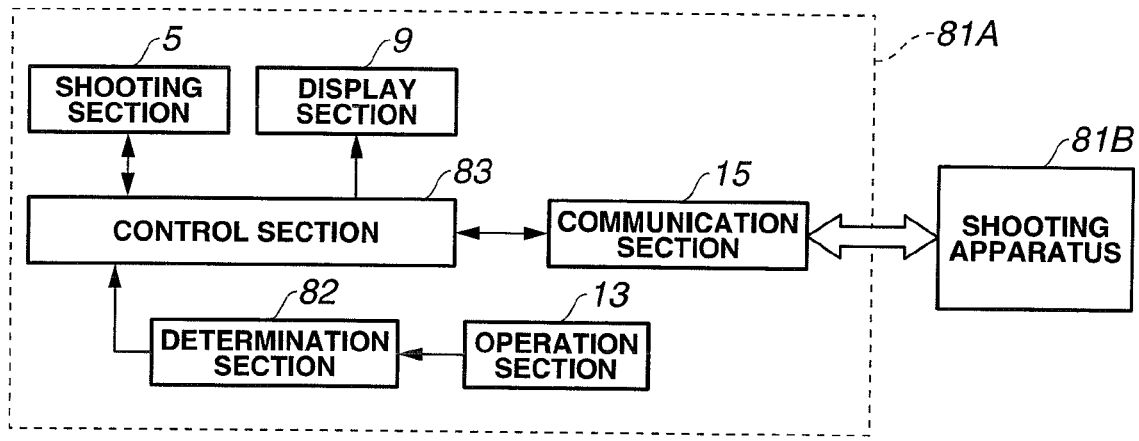
FIG. 1A is a block diagram showing a basic configuration of a shooting apparatus of the present invention.

As shown in FIG. 1A, a shooting apparatus 81A according to the present invention has an image pickup section 5 which performs shooting, a display section 9 which displays an image picked up by the image pickup section 5, and an operation section 13 through which a user performs operations including a shooting command.

The shooting apparatus 81A also has a communication section 15 which performs communication of information including images with a further shooting apparatus 81B separate from the shooting apparatus 81A, and a determination section 82 which determines a left-right placement relationship in the shooting apparatus 81 A with the further shooting apparatus 81 B from a predetermined position in the user's right or left hand held by the user or from a predetermined operation.

The shooting apparatus 81A also has a control section 83 which transmits, to the further shooting apparatus 81B through the communication section 15, a signal for causing at least a portion of an image, and which performs control for receiving at least a portion of an image picked up by the further shooting apparatus 81 B when the further shooting apparatus 81B transmits at least a portion of the image picked up by the further shooting apparatus 81B. In Embodiments 1, 2, and 3 described below, the image pickup section 5 corresponds to an image pickup section 5$i$ ($i$=a or b); the display section 9 to a display section 9$i$; the communication section 15 to a communication section 15$i$; the operation section 13 to an operation section 13$i$; and the control section 83 to an image processing and control section 11$i$. Also, the determination section 82 corresponds to a finger position determination section 17$i$ in Embodiment 1 and to a half-push operation determination section 31$i$ in Embodiments 2 and 3.

The configuration shown in FIG. 1A enables determination of the left-right placement relationship between the two shooting apparatuses 81A and 81B and enables realization of a shooting apparatus suitable for shooting a three-dimensional image. Also, control by the control section 83 enables the shooting apparatus 81A to obtain an image picked up by the shooting apparatus 81B or a portion of the image by causing the shooting apparatus 81 B to transmit the image or a portion of the image.

Figure 1B:
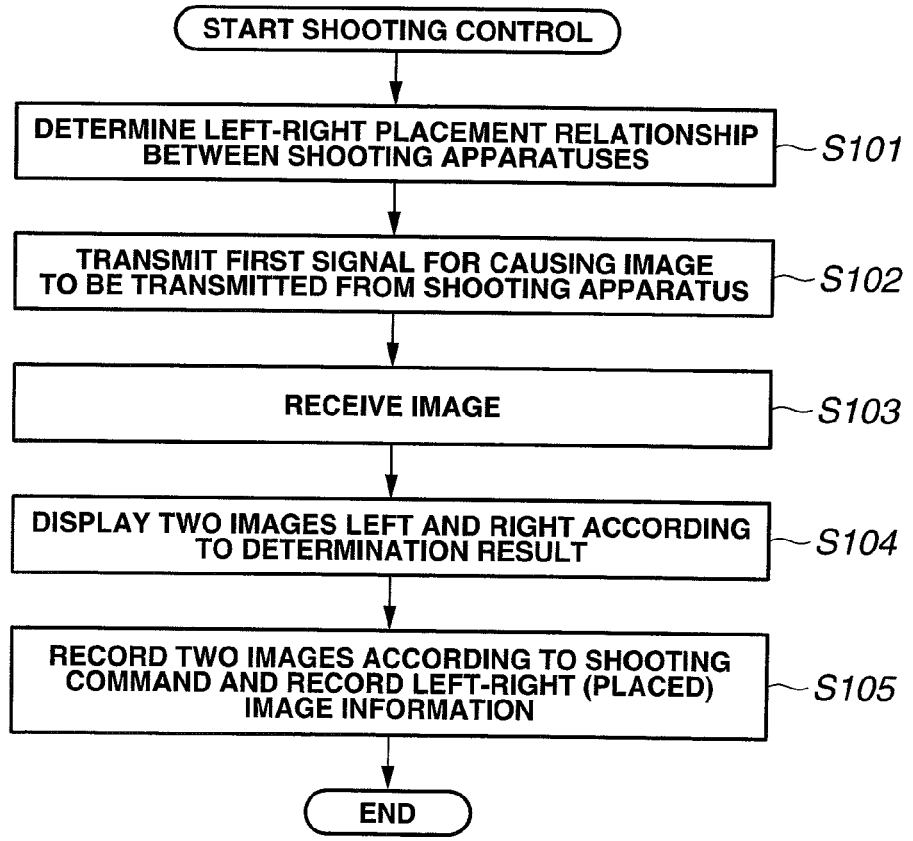
FIG. 1B is a flowchart showing a basic processing procedure of a shooting control method of the present invention.

As shown in FIG. 1B, a shooting control method according to the present invention has a first step S 101 of determining, when a user holds two shooting apparatuses by his/her two hands, the left-right placement relationship in one of the hand-held shooting apparatuses with the other of the shooting apparatuses from a predetermined position at which the one of the shooting apparatuses is held by one of the user's hands or from a predetermined operation performed by the user's one hand, in order to perform three-dimensional shooting.

This shooting control method also has a second step S102 of transmitting from the one of the two shooting apparatuses to the other of the shooting apparatuses a first signal for causing an image to be transmitted, and a third step S103 of receiving the image transmitted from the other of the shooting apparatuses.

This shooting control method also has a fourth step S104 of displaying two images: an image picked up by the one of the shooting apparatuses and an image picked up by the other of the shooting apparatuses by placing the images left and right according to the result of determination of the left-right placement relationship.

Through the shooting control method shown in FIG. 1B, a shooting control method can be realized which enables determining the left-right placement relationship between the two shooting apparatuses, displaying two images by correctly placing the images left and right, and facilitating confirmation of the three-dimensional effect of the two images.

The shooting control method further has a fifth step S105 of recording the two images and recording information on the left-right placement relationship between the two images according to the determination result when a shooting command operation is performed.

Figure 8:
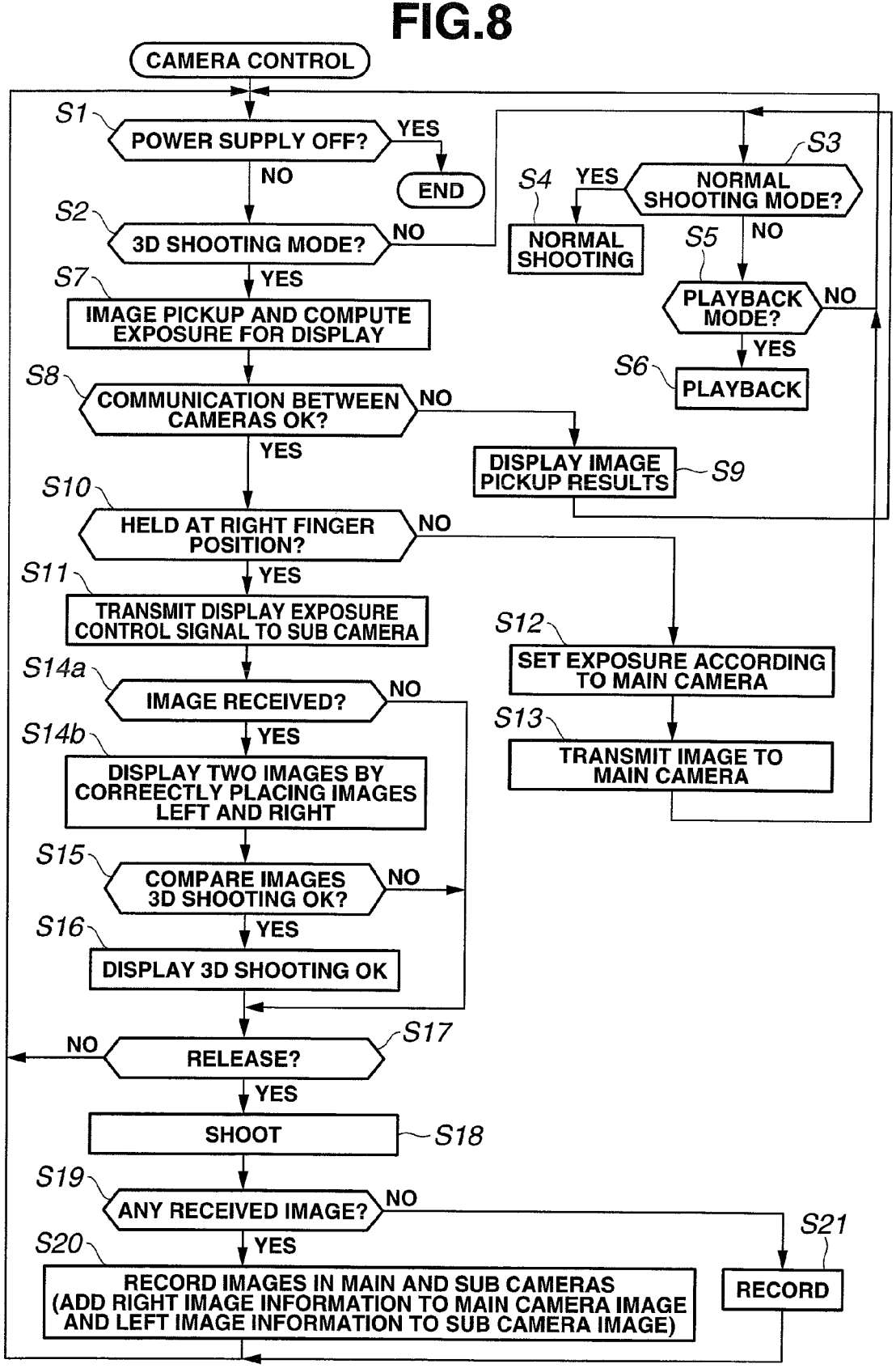
FIG. 8 is a flowchart showing contents of processing in a camera control method in Embodiment 1.
Figure 15:
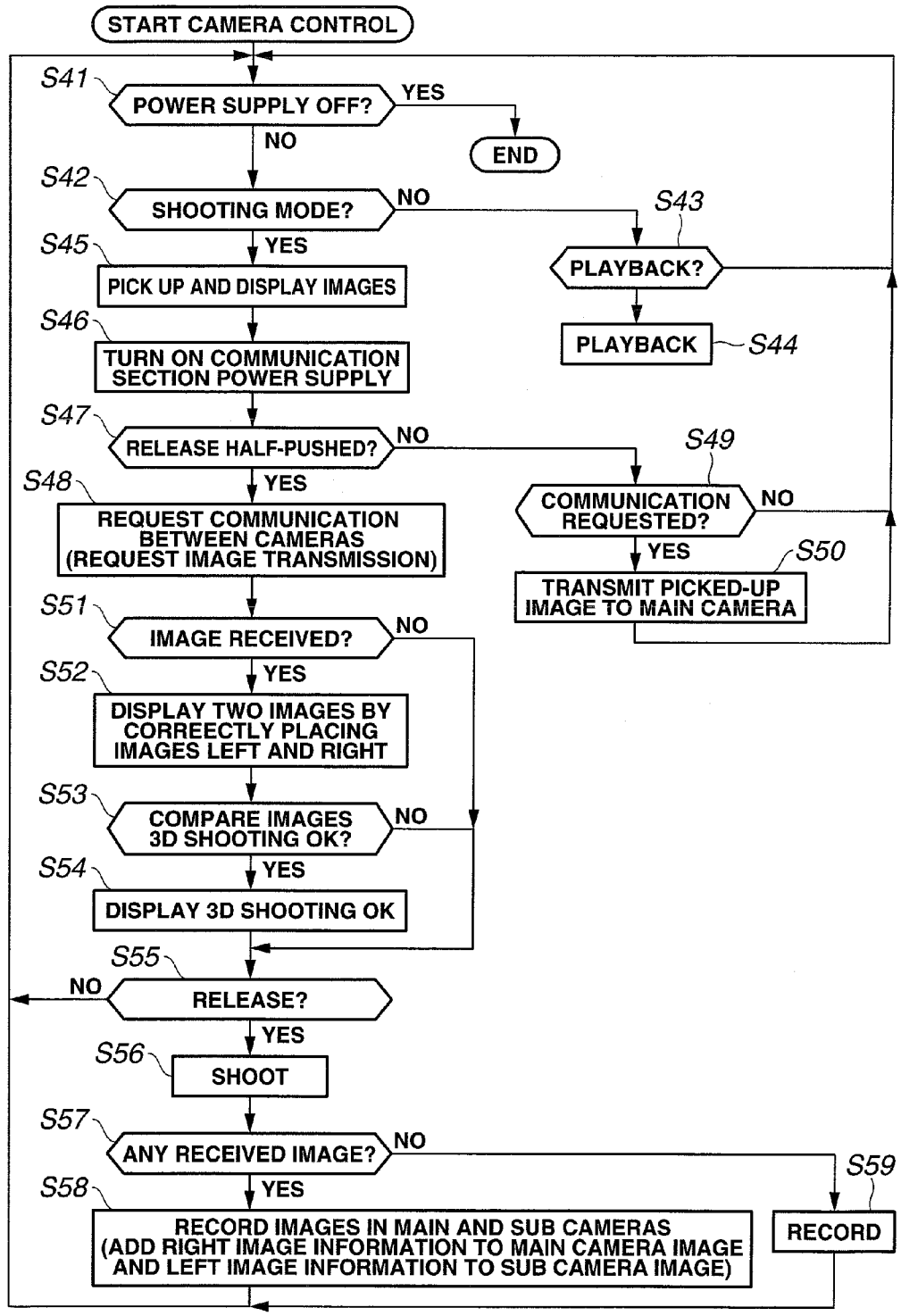
FIG. 15 is a flowchart showing contents of processing in a camera control method in Embodiment 2.
Figure 19:
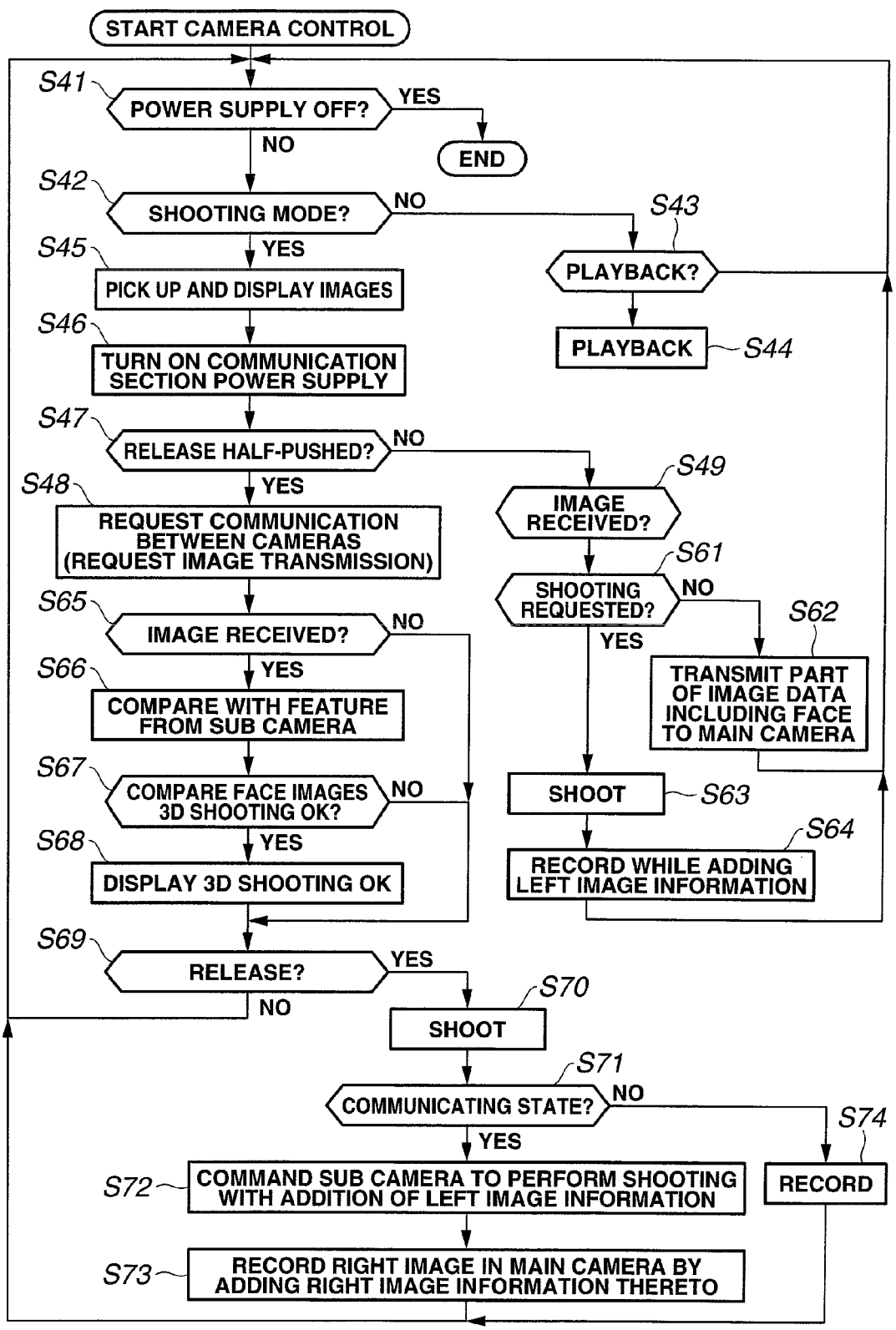
FIG. 19 is a flowchart showing contents of processing in a camera control method in Embodiment 3.

The above-described first step S101 corresponds, in Embodiment 1, to determination in step S10 in FIG. 8 as to whether or not a hold at a right finger position is kept and, in Embodiments 2 and 3, to determination in step S47 in FIGS. 15 and 19 as to whether or not a release half-push operation has been performed.

The above-described second step S102 corresponds, in Embodiment 1, to processing in step S11 in FIG. 8 for transmitting an exposure control signal for display and, in Embodiments 2 and 3, to processing in step S48 in FIGS. 15 and 19 for communication request (image transmission request) between cameras.

The above-described third step S103 is, in Embodiment 1, included in processing in step S14a in FIG. 8 as to whether or not image receiving can be performed and, in Embodiments 2 and 3, included in processing in step S51 in FIG. 15 and step S65 in FIG. 19 as to whether or not image receiving can be performed.

The above-described fourth step S 104 corresponds, in Embodiment 1, to processing in step S 14b in FIG. 8 for displaying two images by correctly placing the images left and right and, in Embodiment 2, to similar processing in step S52 in FIG. 15.

The above-described fifth step S 1 05 corresponds, in Embodiment 1, to processing in step S20 in FIG. 8 for recording images obtained by a main camera and a sub camera (addition of information on a right image to an image obtained by the main camera and addition of information on a left image to an image obtained by the sub camera) in step S58 in FIG. 15 and, in embodiment 2, to similar processing in step S58 in FIG. 15.

Embodiments of the present invention will be described in detail with reference to FIG. 1C and other subsequent figures.

Embodiment 1

As shown in FIG. 1C, a shooting system 1 provided with Embodiment 1 of the present invention is constituted of a first camera (also referred to simply as "camera") 2A serving as the shooting apparatus 81A in FIG. 1A, and a second camera (also referred to simply as "camera") 2B serving as the further shooting apparatus 81B in FIG. 1A.

A user can shoot a three-dimensional (referred to simply as "3D") image by holding the two cameras 2A and 2B by his/her right and left hands, respectively, so that a left-right parallax is set with respect to one subject, as described below.

Needless to say, one of the cameras not operated may be fixed on a stand or a tripod.

The camera 2A and the camera 2B are, for example, identical in configuration to each other. Description will be made below mainly of the camera 2A. The camera 2B has the same configuration as that of the camera 2A.

Figure 2:
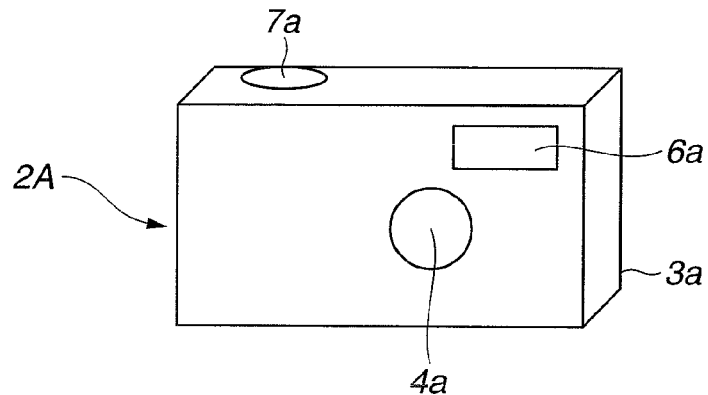
FIG. 2 is a diagram showing a front-side appearance of a camera constituting a shooting apparatus according to Embodiment 1.

As shown in FIG. 2, an image pickup lens 4a for forming an optical image of a subject is provided approximately at a center of a front surface of a case 3A of the camera 2A. At the position at which an image is formed by the image pickup lens 4a, an image pickup device such as a charge-coupled device is disposed and the image pickup lens 4a and the image pickup device form an image pickup section 5a (see FIG. 1C).

A flash lamp 6a used for flash showing is provided in a portion on the periphery of the image pickup lens 4a. A release button 7a as a shooting (command) button to be operated for a release (shooting command) operation by a user is provided in an upper surface of the case 3a.

Figure 3:
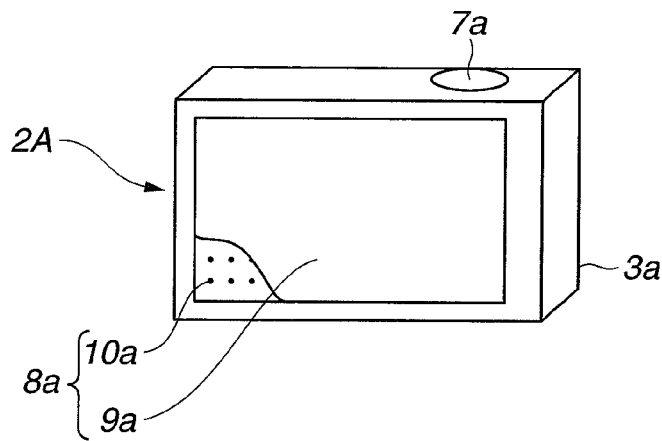
FIG. 3 is a diagram showing a rear-side appearance of the camera shown in FIG. 2.

As shown in FIG. 3, on the back surface side of the camera 2A, a touch panel 8a capable of being operated in a touch (contact) operation manner for operations according to various commands by a user using his/her finger is provided in a rectangular region slightly smaller than the size of the entire back surface.

The touch panel 8a has a display section 9a which is formed of, for example, a liquid crystal panel and which displays picked-up images and the like, and a light receiving element array 10a disposed, for example, in matrix form on the inner surface (back surface) side of the display section 9a to detect the position at which an operation is performed in a touching manner. The light receiving element array 10a detects the quantity of incident light entering from the front surface side thereof. When a user performs a touch operation on the touch panel 8a, the quantity of incident light before the touch operation is changed. In other words, the quantity of incident light entering the light receiving element at the operated position is different from the quantities of incident light entering non-operated peripheral portions.

A detection signal from the light receiving element array 10a is inputted to an operation determination section 14a (see FIG. 1C). The operation determination section 14a determines the operated position from the detection signal to determine the operation corresponding to the operated position. Also in a case where operating buttons are provided in the touch panel 8a, the operation determination section 14a determines the function of each operating button from the corresponding operated position.

As shown in FIG. 1C, the camera 2A has the image pickup section 5a that performs shooting, the image processing and control section 11a that (as the control section 83 in FIG. 1A) performs image processing on the image pickup section 5a and controls each section, a recording section 12a which records picked-up images, and the display section 9a that displays picked-up images and the like.

The image pickup section 5a may be of a configuration including a lens drive section for electrically driving the image pickup lens 4a. The image pickup lens 4a may be a zoom lens.

The camera 2A also has an operation section 13a through which a user performs various command operations, the operation determination section 14a that determines an operation on the operation section 13a, a communication section 15a which performs communication with the other camera 2B, and a clock section 16a which performs date/time measurement. The operation section 13a includes the release button 7a, and operating buttons (not shown) and detection areas 23a and 24a described below, which function as operation portions in the touch panel 8a.

The camera 2A also has a finger position determination section 17a which determines a finger position as a predetermined position when a user holds the camera 2A by his/her hand. The finger position determination section 17a forms the determination section 82 in FIG. 1A. Since the finger position determination section 17a is formed by using the touch panel 8a, it is shown in parentheses in FIG. 1C.

The image pickup device in the above-described image pickup section 5a outputs an image pickup signal photoelectrically converted by application of a drive signal from a drive section in the image processing and control section 11a. The image processing and control section 11a (an image processing section in the image processing and control section 11a) performs image processing on an input image pickup signal to produce an image signal, which is outputted to the display section 9a.

The display section 9a displays an image corresponding to the image signal.

A memory 18a temporarily stores an image signal for an image picked up by the image pickup section 5a (referred to simply as "image") and temporarily stores an image from the other camera 2B received through the communication section 15a.

The display section 9a performs finder display (live view display) such that images picked up by the image pickup section 5a are displayed by being successively replaced one with another, displays shooting results and displays shooting modes or the like. In the case of performing 3D shooting as described below, the display section 9a displays two images temporarily stored in the memory 18a by placing the images left and right.

The image processing and control section 11a performs controls for recording in the recording section 12a an image displayed by the display section 9a when a release command operation with the release button 7a is inputted through the operation determination section 14a.

The recording section 12a is constituted by a nonvolatile semiconductor memory capable of recording information including images (e.g., a flash memory), a small hard disk unit or the like. The recording section 12a may be constructed so as to be detachable from the camera 2A.

The image processing and control section 11a also performs control for recording information on the shooting date/time (recording date/time) measured by the clock section 16a when an image is recorded in the recording section 12a.

The image processing and control section 11a also has a function to transmit an image displayed by the display section 9a to the other camera 2B through the communication section 15a and a function to receive through the communication section 15a an image transmitted from the other camera 2B.

In other words, the image processing and control section 11a has a function of a control section to control transmission and reception of images through the communication section 15a.

The image processing and control section 11a also has a function (a function of the control section 83 in FIG. 1A) to perform control for causing an image picked up by the other camera 2B to be transmitted by transmitting through the communication section 15a a signal for causing the image picked up by the other camera 2B to be transmitted.

The image processing and control section 11a also has a function to transmit an image picked up by the image pickup section 5a to the other camera 2B when receiving a signal for causing the image to the transmitted from the other camera 2B through the communication section 15a.

The communication section 15a performs wireless communication with the communication section of the other camera by using electric waves, infrared rays or the like.

The image processing and control section 11a also has a function of a display control section 19a to perform display control in displaying an image through the display section 9a.

The display control section 19a is also capable of determining whether shooting is performed through a portrait frame or through a landscape frame from the results of determination made by the finger position determination sections 17a and 17b. This function will be described in the description of a modified example of Embodiment 3.

The display control section 19a performs display control for displaying two images left and right through the display section 9a in a case where 3D shooting is performed by using the camera 2A and the other camera 2B.

In this case, for determination as to whether or not two images displayed left and right through the display section 9a are satisfactory as a 3D image, the image processing and control section 11a has functions of a comparison and determination section 20a having a function of a comparison section to compare two images and a function of a determination section to determine from a result of comparison whether or not 3D shooting can be satisfactorily performed.

The display control section 19a in the image processing and control section 11a also has a function of a result display control section 29a to perform control for displaying through the display section 9a whether or not 3D shooting is OK as a determination result.

In this case, control for displaying each of determination results: "OK" and "NG" may be performed.

The image processing and control section 11a is connected to a ROM 21a serving as a control program storage section in which a control program for performing 3D shooting is stored. As the control program storage section in which the control program is stored, a publicly known recording medium such as a nonvolatile semiconductor memory or a hard disk may be adopted.

In the ROM 21a, a main camera control program for performing a control process as a main camera as described below and a sub camera control program for performing a control process as a sub camera are stored. In the ROM 21a, a control program for use in an ordinary case of shooting with one camera, not relating to a combination of main and sub cameras, is also stored.

The image processing and control section 11a performs the control process by using the main camera control program in the case of performing the control process as a main camera according to the result of determination made by the finger position determination section 17a.

On the other hand, the image processing and control section 11a performs the control process by using the sub camera control program in the case of performing the control process as a sub camera according to the result of determination made by the finger position determination section 17a. That is, control programs adapted to both the control process for operating as a main camera and the control process for operating as a sub camera are stored in the ROM 21a.

A sub camera in the case of performing the process based on the sub camera control program performs the process in association with and subordinately to a main camera.

The operation section 13a is constituted by the release button 7a and operating buttons or the like disposed in the touch panel 8a. For example, as the operating buttons, a 3D shooting mode button for performing 3D shooting and a normal shooting button for performing normal shooting are provided.

Operating buttons serving as the 3D shooting mode button and the like are not limited to those provided in the touch panel 8a. The operation section 13a includes below-described detection areas 23a and 24a in the touch panel 8a.

An operation on the operation section 13a performed by a user is determined by the operation determination section 14a. The operation determination section 14a sends the operation determination result to the image processing and control section 11a. The image processing and control section 11a performs the control process corresponding to the operation determination result.

In the present embodiment, the touch panel 8a using the light receiving element array 10a has a function of the finger position determination section 17a to determine the position of a right finger or the position of a left finger in a state of holding (or in contact with) the touch panel 8a when a user holds the camera 2A by his/her hand.

The finger position determination section 17a sends a result of determination of the right finger position or the left finger position to the image processing and control section 11a via the operation determination section 14a. The finger position determination section 17a may be configured so as to send the determination result to the image processing and control section 11a (not via the operation determination section 14a). Also, when the camera is operated by a right hand, the finger position determination section 17a may determine shooting a left image with the other camera.

The image processing and control section 11a determines the left-right placement relationship between the two cameras 2A and 2B from the determination result. The determination result is used, for example, in a shooting control method for 3D shooting, or for display of two images picked up by the two cameras 2A and 2B and for recording of images when the release operation is performed.

Figure 4:
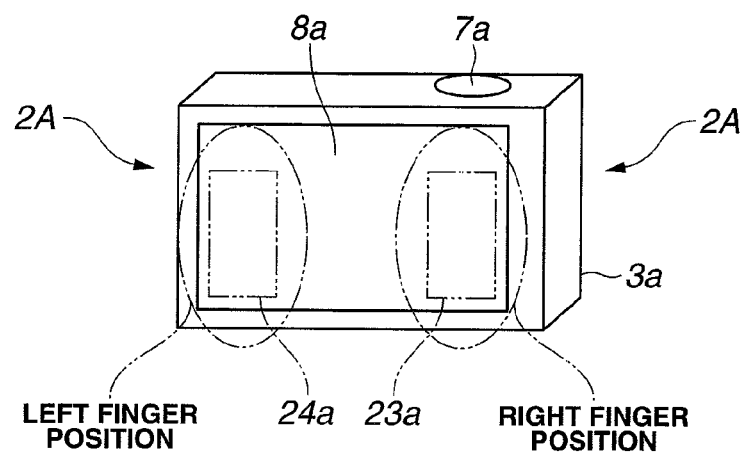
FIG. 4 is an explanatory diagram showing the provision of areas for detection of a right finger position and a left finger position in a touch panel of the camera shown in FIG. 3.

In the touch panel 8a, as shown in FIG. 4, the right finger position detection area 23a is set in the vicinity of the right end, while the left finger position detection area 24a is set in the vicinity of the left end, thereby forming the above-described finger position determination section 17a. The light receiving element array disposed in the detection area 23a detects or determines whether or not a right finger is holding or in contact with the detection area 23a. In the following description, an expression using "hold" implies a state of being in contact as well.

The light receiving element array disposed in the detection area 24a determines a hold of the detection area 24a by a left finger.

Thus, the touch panel 8a has the function of the finger position determination section 17a to determine the position of a right finger or the position of a left finger in a state of holding the touch panel 8a when a user holds the camera 2A by his/her hand.

Figure 5:
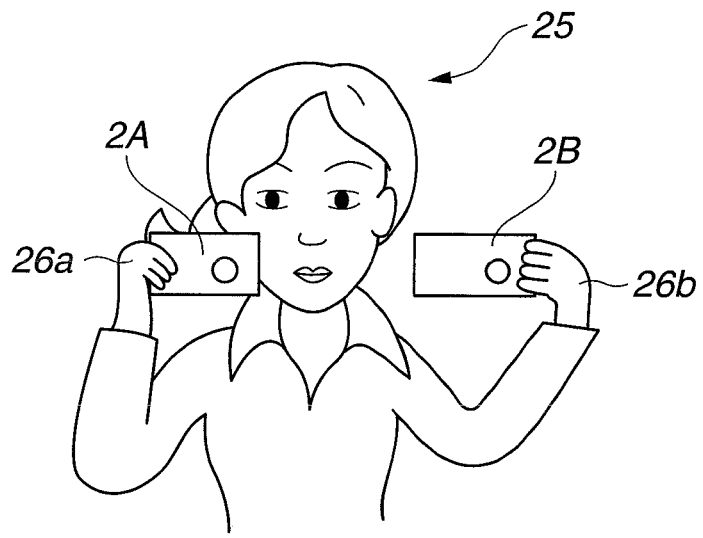
FIG. 5 is a diagram showing a state in which one user holds two cameras for three-dimensional shooting.

The result of determination made by the finger position determination section 17a is used for determination of the left-right placement relationship between the two cameras 2A and 2B in a 3D shooting mode in which one user 25 performs 3D shooting (on one subject 27 shown in FIG. 7) by holding the two cameras 2A and 2B by his/her two hands as shown in FIG. 5.

In the case where one user 25 performs 3D shooting by holding the two cameras 2A and 2B by his/her two hands, the user ordinarily holds one camera 2A by his/her right hand 26a and the other camera 2B by his/her left hand 26b.

In this case, there is a need to operate the release button 7a disposed at a right-hand position for performing a shooting command operation. In this case, operating (the camera 2A held by the right hand 26a) by the right hand 26a can be performed with higher operability in comparison with operating (the camera 2B held by a left hand 26b) by the left hand 26b.

That is, the operability can be improved if the camera 2A held by the right hand 26a and disposed on the right-hand side is used as a main camera (or a master camera) to be mainly operated by the user 25, while the camera 2B disposed on the left-hand side is used as a sub camera (or a slave camera) operated by being linked to the main camera. To realize this, in the present embodiment, the image processing and control sections 11a and 11b determine whether or not a hold at a right finger position is kept by the user 25 and perform the main camera control process and the sub camera control process according to the result of this determination.

The image processing and control sections 1a and 11b use this determination result for image display and image recording.

Figure 6:
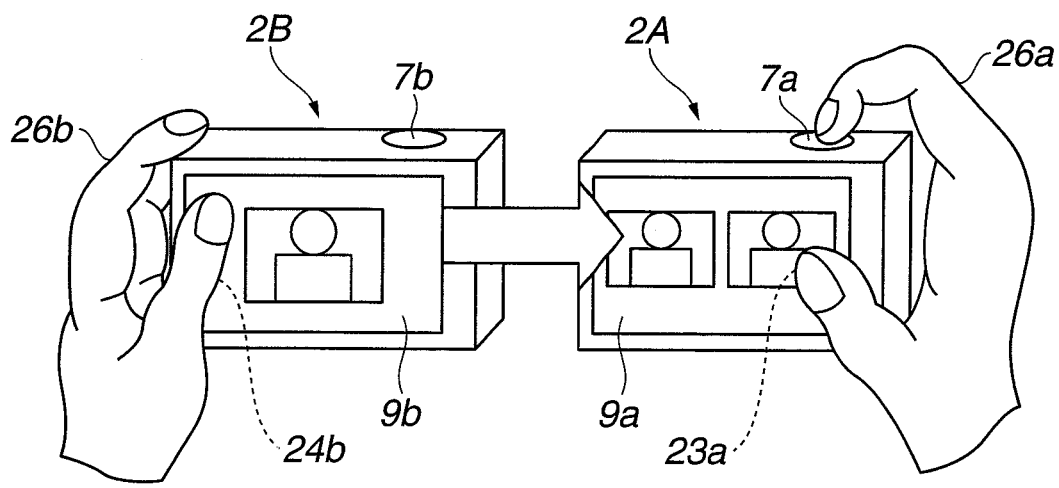
FIG. 6 is a diagram showing portions at and around the hands in FIG. 5 and showing a state in which an image obtained by the camera held by the left hand is transmitted to the camera held by the right hand, and in which two images are displayed by being placed left and right.

FIG. 6 shows a state where one user 25 performs 3D shooting by holding the two cameras 2A and 2B.

As shown in FIG. 6, the right finger position detection areas 23a in the touch panel 8a of the camera 2A disposed on the right-hand side is held by a right finger, while a left finger is in contact with the left finger position detection areas 24b in the touch panel 8b of the camera 2B disposed on the left-hand side. Thus, the finger position determination section 17a has the function of the determination section 82 to determine the left-right placement relationship between the two cameras 2A and 2B at least before a shooting command operation is performed (control may, of course, be performed by assuming that, if the location of one of the cameras on the right-hand side is ascertained, the other camera is disposed on the left-hand side regardless of the result from the touch panel).

In the present embodiment, when setting in the 3D shooting mode for performing 3D shooting is made as shown in FIG. 6, the camera 2B on the left-hand side held by the left hand 26b operates by being linked to operations on the camera 2A on the right-hand side held by the right hand 26a.

As shown in FIG. 6, the camera 2B transmits an image picked up by the camera 2B to the camera 2A on the right-hand side held by the right hand 26a.

Also, the camera 2A on the right-hand side receives the transmitted image and displays this image and an image picked up by the camera 2A by placing these images left and right in the display section 9a.

Figure 7:
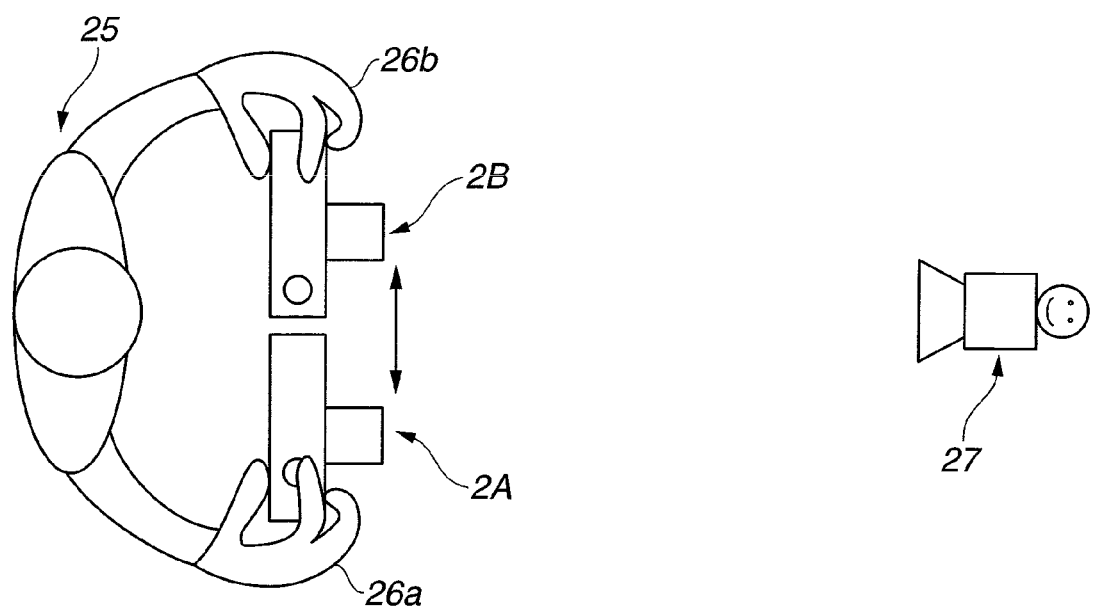
FIG. 7 is a diagram showing the state of FIG. 5 seen from above, in which one user performs shooting on a subject with two cameras.

FIG. 7 shows 3D shooting including the state shown in FIG. 6 and shooting on the subject 27.

If the conditions for satisfactorily performing 3D shooting are satisfied, the user 25 can easily perform 3D shooting on one subject 27 with the two cameras 2A and 2B by performing the release operation.

The configuration of the camera 2A has been described with reference to FIG. 1C. The camera 2B also has the same configuration. Components of the camera 2B corresponding to components OOa of the camera 2A are indicated by OOb.

A typical processing procedure in a case where one user 25 performs 3D shooting on the subject 27 at one position by holding and operating one of two cameras 2A and 2B as a main camera and the other of cameras 2A and 2B as a sub camera will be described with reference to FIG. 8.

By powering on the camera 2A and 2B, each of the camera 2A and 2B is made operational. The image processing and control sections 11a and 11b determine in first step S1 whether or not the power supply is turned off by the user 25. If the power supply is turned off, the image processing and control sections 11a and 11b end this process.

If the power supply is not off, the image processing and control sections 11a and 11b determine in subsequent step S2 whether or not setting in the 3D shooting mode has been made. For example, the image processing and control sections 11a and 11b determine whether or not the user 25 has made setting in the 3D shooting mode through the operation sections 13a and 13b.

If setting in the 3D shooting mode has not been made, the image processing and control sections 11a and 11b determine, as shown in step S3, whether or not an operation to select the normal shooting mode has been performed. In this case, a process in each camera in a single state is performed.

If the normal shooting mode has been selected, a process for normal shooting is performed as shown in step S4. If the normal shooting mode has not been selected, the image processing and control sections 11a and 11b determine, as shown in step S5, whether or not a playback operation has been selected. In the case of determining that that playback has been selected, the image processing and control sections 11a and 11b perform a playback process as shown in step S6.

If the result of determination in step S5 is not playback, the process returns to step S1. In the case of determining in step S2 that selection of the 3D shooting mode has been made, the image processing and control sections 11a and 11b perform image pickup and compute exposure for display as shown in step S7.

Further, in step S8, the image processing and control sections 11a and 11b perform communication between the cameras 2A and 2B and determine whether or not communication can be performed between the cameras 2A and 2B. If communication cannot be performed between the cameras 2A and 2B, the image processing and control sections 11a and 11b display, in subsequent step S9, the results of image pickup through the display sections 9a and 9b by the functions of the display control sections 19a and 19b, and the process returns to step S3. In this case, the process in each camera in a single state is performed.

If communication can be performed between the cameras 2A and 2B, each of the finger position determination sections 17a and 17b determines in step S10 whether or not the right finger position detection area 23a or 23b is held.

In a case where the user 25 holds the two cameras 2A and 2B by his/her two hands as shown in FIG. 5 for example, the finger position determination section 17a determines that the right finger position detection area 23a is held.

The finger position determination section 17a sends this determination result to the image processing and control section 11a. The image processing and control section 11a is set in a state of performing the control process as a main camera by using the program for the main camera.

With respect to determination processing in step S10, the finger position determination section 17b determines that the right finger position detection area 23b is not held. The finger position determination section 17b sends this determination result to the image processing and control section 11b. The image processing and control section 11b is set so as to perform the control process as a sub camera by using the program for the sub camera.

The configuration may alternatively be such that only one of the cameras, which is to operate as a main camera, is determined from the determination result of the right finger position detection areas 23a and 23b only.

In such a case, for example, a transmission request signal for requesting transmission of an image to the main camera may be transmitted to the sub camera in order to make the other camera operate as a sub camera. In such a case, any signal for starting transmission of an image to the main camera, not limited to the image transmission request signal, may suffice.

In the following description, the main camera is referred to as camera 2A, and the sub camera as camera 2B. However, it is apparent that the same description can apply to the inverse case (that is, the main camera is camera 2B while the sub camera is camera 2A). For example, in a case where a camera operated by being held at the left side of the screen is detected, this camera is controlled as a main camera for a left image, while the other camera is controlled as a sub camera for a right image.

In subsequent step S11, the main camera 2A transmits an exposure control signal for display from the communication section 15a to the sub camera 2B. The sub camera 2B receiving the exposure control signal for display from the communication section 15b sets, according to the exposure control signal for display received, exposure for display matched to that in the main camera 2A as shown in step S12.

After setting the exposure for display matched to that in the main camera 2A, the sub camera 2B picks up a moving image of the subject 27 for example. Also, as shown in step S13, the sub camera 2B transmits an image signal for the picked-up image to the main camera 2A through the communication section 15b.

It can also be said that the above-described exposure control signal for display has the function of a signal which causes an image picked up by the sub camera 2B to be transmitted to the main camera 2A as well as the function of the control signal from the main camera 2A to the sub camera 2B to match the exposure to that in the main camera 2A.

The process in the sub camera 2B returns to step S1 after step S13. Accordingly, the sub camera 2B thereafter repeats transmitting the picked-up image to the main camera 2A.

On the other hand, as shown in step S14a, the main camera 2A determines whether or not the image transmitted from the sub camera 2B can be received through the communication section 15a. If the image cannot be received, the process moves to step S17.

If the image is received, the image is temporarily stored in the memory 18a.

In this case, the main camera 2A also temporarily stores in the memory 18a an image picked up by the main camera 2A.

In this case, the main camera 2A stores the right image picked up as a main image by the main camera 2A and the left image picked up as a sub image by the sub camera, for example, by putting the right and left images in a right image storage area and a left image storage area, respectively.

As shown in step S14b, the main came 2A thereafter reads out the two images, i.e., the left image and the right image, from the memory 18a, and displays the two images through the display section 9a of the main camera 2A by correctly placing the images left and right.

FIG. 6 shows the state of display of the images by the main camera 2A and the sub camera 2B in this case.

As shown in FIG. 6, the sub camera 2B displays the picked-up image through the display section 9b; the image is also transmitted to the main camera 2A as schematically indicated by the thick arrow; and the transmitted image is displayed in a left display area in the display section 9a of the main camera 2A. In a display area on the right-hand side of this image, the image picked up by the main camera 2A is displayed.

By referring to the images displayed left and right, the user 25 can check the two images before performing 3D shooting as to whether or not the images are suitable for 3D shooting. The facility with which 3D shooting is performed is thus improved. Also, the user 25 may adjust the distance between the two cameras 2A and 2B in the left-right direction, for example, as shown in FIG. 7.

The left-right parallax between the two cameras 2A and 2B can be increased by increasing the left-right distance between the two cameras 2A and 2B with respect to the distance from the two cameras 2A and 2B to the subject 27. The 3D shooting effect is thereby increased. Therefore, the user 25 may perform 3D shooting by adjusting the distance between the two cameras 2A and 2B.

In step S15 subsequent to step S14, the image processing and control section 11a of the main camera 2A (the comparison and determination section 20a in the image processing and control section 11a) compares the two images and determines whether or not the images are in such a state that 3D shooting can be satisfactorily performed.

For example, the image processing and control section 11a (the comparison and determination section 20a in the image processing and control section 11a) extracts, for example, a main subject in the two images and determines whether or not 3D shooting can be satisfactorily performed depending on whether or not the amounts of difference between a plurality of typical positions in the main subject or the corresponding pixel values obtained by pattern matching or the like are within a certain range set in advance. A method described below with reference to FIG. 21 may also be applied to this determination.

If the result of determination is that 3D shooting can be satisfactorily performed, the main camera 2A (the result display control section 29a of the main camera 2A) displays, for example "3D shooting OK" on the display section 9a as shown in step S16.

Figure 9:
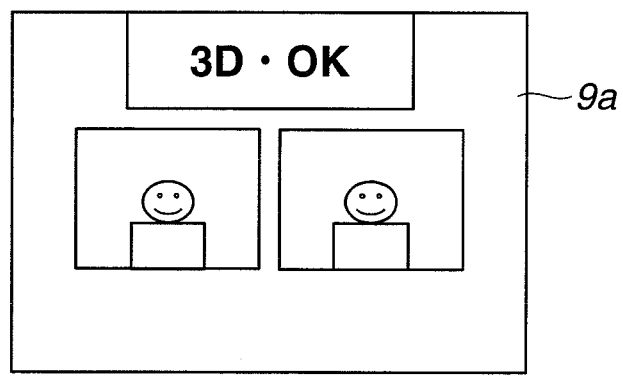
FIG. 9 is an explanatory diagram for making determination for three-dimensional shooting in FIG. 7.
Figure 10:
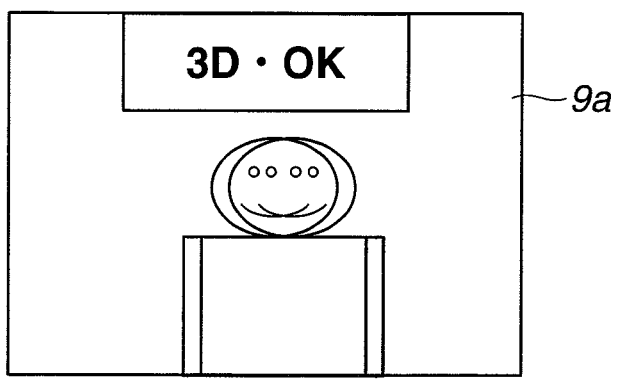
FIG. 10 is an explanatory diagram showing a modified example of FIG. 9.

FIGS. 9 and 10 show examples of displays in this case. Referring to FIG. 9, "3D, OK" is displayed while the images are displayed left and right. However, "3D, OK" may be displayed while the two images are displayed in a superimposed state as shown in FIG. 10. Needless to say, a 3D-capable display device may be mounted to actually produce a 3D display by using the two images.

After step S16, the main camera 2A and the sub camera 2B determine in subsequent step S17 as to whether or not the release operation has been performed.

Also in the case where the result of determination in step S15 is that 3D shooting cannot be satisfactorily performed, the process advances to step S17. In the case where the result of determination is that 3D shooting cannot be satisfactorily performed, for example, "3D shooting, NG" or "3D, NG" may be displayed.

When the release operation is performed by the user 25 in step S17, the main camera 2A or the sub camera 2B performs shooting as shown in step S18. Needless to say, when conditions for satisfactorily performing 3D shooting are satisfied, shooting may be performed upon determining that the camera is held in position with stability, even if the release operation has not been performed by the user 25.

In subsequent step S19, the main camera 2A or the sub camera 2B determines the existence/nonexistence of the received image. In the case of the existence of the received image, performing the release operation in step S17 only on the main camera 2A suffices.

In the case of the existence of the received image, the main camera 2A records in the recording section 12a the two images obtained by the main camera 2A and the sub camera 2B stored in the memory 18a.

In this case, the main camera 2A adds, to the image obtained by the main camera 2A in 3D shooting, information (e.g., "R") indicating that the image is a right image disposed on the right-hand side, adds, to the image obtained by the sub camera 2B, information (e.g., "L") indicating that the image is a left image disposed on the left-hand side, and records the images. In this case, the main camera 2A also adds information indicating that the two images form a pair when 3D shooting is performed.

That is, when the main camera 2A records the two images, it adds information items respectively to the images, the information items enabling discrimination between the left and right placements. Also, in this case, as mentioned above, there is no need for the release operation in the sub camera 2B. After step S20, the process returns to step S1.

Thus, the images are recorded after adding left-right placement information to the images, thereby enabling 3D image management and 3D playback to be smoothly performed.

That is, since information on the left-right placement relationship or left-right image information is added to the images forming a pair when 3D shooting is performed, the image processing and control section 11a can easily place and display the images left and right by using the information, for example, when 3D playback is performed, thus enabling image management or the like to be smoothly performed.

Also in the state where the two images are temporarily stored in the memory 18a, such left-right (placement) information may be added. If the information is added, the information can be effectively utilized also when the two images are displayed.

In the case of determining in step S19 that no received image exists, the cameras 2A and 2B respectively record the shot images in the recording sections 12a and 12b as shown in step S21 and the process returns to step S1.

In the present embodiment operating as shown in FIG. 8, the user 25 holds the two cameras 2A and 2B with one of the cameras held by the right hand 26a in an operational placement such that the release operation can be easily performed by the right hand 26a, and the camera held by the right hand 26a is determined as the main camera 2A, while the camera held by the left hand 26b is determined as the sub camera 2B. By following the control process performed by the main camera 2A, the sub camera 2B performs the control process linked thereto.

Accordingly, the user 25 performs the release operation for performing 3D shooting on the main camera 2A. Therefore, the need for the release operation on the sub camera 2B is eliminated, thus facilitating 3D shooting. The present embodiment has a configuration easily applicable to existing cameras and enables implementation of the shooting system 1 capable of easily performing 3D shooting at a low cost.

Figure 11:
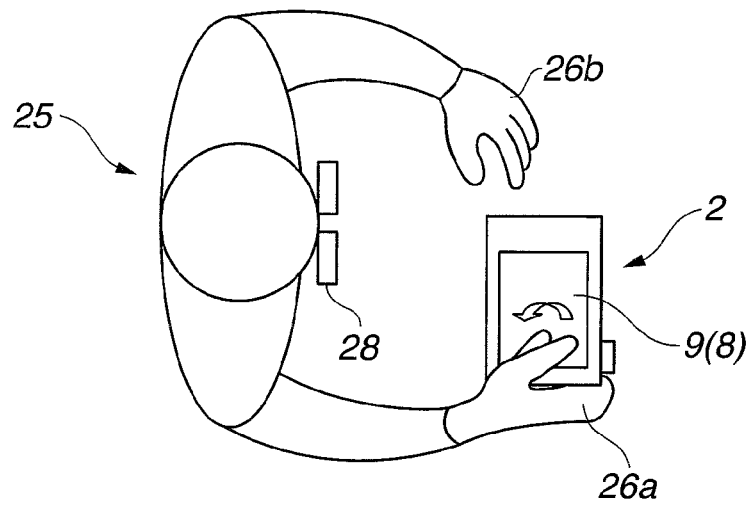
FIG. 11 is a diagram showing from above a user a state in which the user wearing a face mount display apparatus plays back the camera.

A process in which shot images are played back will next be described. FIG. 11 shows a state in which the user 25 wears a face mount display apparatus (hereinafter, referred to as "FMD") 28 and plays back images shot with the camera 2.

Figure 12:
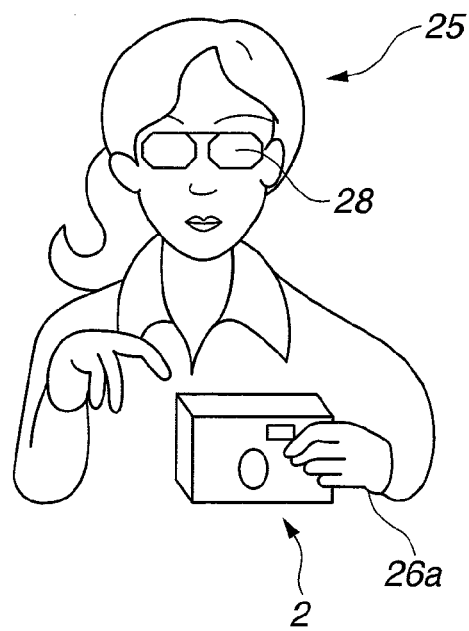
FIG. 12 is a front view of FIG. 11.

The user 25 can select an image to be observed in an enlarged state from a plurality of thumbnail images displayed on the touch panel 8 by the display section 9, by performing a touch operation on the touch panel 8" FIG. 12 shows a state shown from a position in front of the user 25, i.e., in this case, a state in which the user holds the camera 2 by the left hand 26b and operates the touch panel by the right hand 26a. The FMD 28 is provided with a communication section for performing communication with the camera 2.

Description of this playback process can be made of either of the main camera 2A and the sub camera 2B. Therefore the camera in the following description is simply referred as camera 2, and the components of the camera 2 are shown without suffixes a and b.

Figure 13:
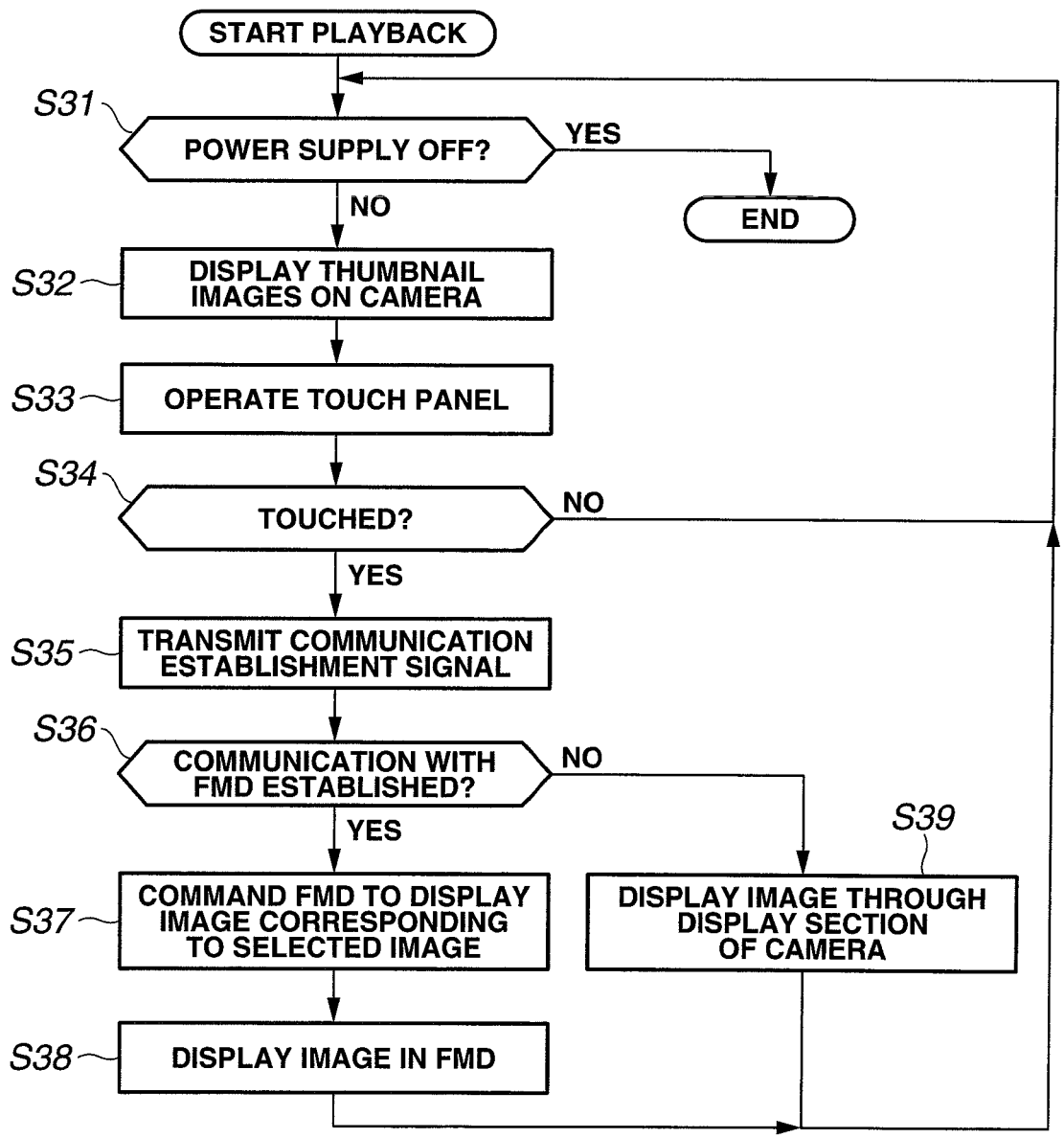
FIG. 13 shows a control procedure in Embodiment 1 when a shot image is played back.

When the playback process is started, the image processing and control section 11 determines in first step S31 in FIG. 13 whether the power supply is turned off. When an operation to turn off the power supply is performed, the image processing and control section 11 turns off the power supply and ends this process.

If the power supply is not turned off, the image processing and control section 11 displays, in subsequent step S32, through the display section 9, a plurality of thumbnail images as reduced images of the images recorded in the recording section 12 of the camera 2.

In subsequent step S33, the image processing and control section 11 operates the touch panel 8. In subsequent step S34, the image processing and control section 11 determines whether or not the touch panel 8 in the operating state has been touched on the basis of the detection signal from the light receiving element array 10.

The user 25 can perform an operation to select an image to be played back from the plurality of thumbnail images by operating the touch panel 8. FIG. 11 shows a state in which the touch panel 8 is touched. If it is determined in step S34 that the touch panel 8 is not touched, the process returns to step S31.

If it is determined that the touch panel 8 is touched, the camera 2 transmits in subsequent step S35 a communication establishment signal for establishing a communication from the communication section 15 to the communication section of the FMD 26.

In subsequent step S36, the camera 2 determines whether or not a communication has been established from the existence/nonexistence of a return signal from the FMD 26.

When a communication is established, the camera 2 transmits, in subsequent step S37, a command signal to the FMD 26 through the communication section 15 to make the FMD 26 display the image (not yet reduced) corresponding to the image selected in the thumbnail images (referred to as "selected image"). The camera 2 also transmits the image (not yet reduced) to the FMD 26.

In subsequent step S38, the FMD 26 plays back and displays the image corresponding to the transmitted selected image. The process then returns to step S31.

If the result of determination in step S36 is that no communication can be established, the camera 2 fully displays the image corresponding to the selected image through the entire screen in the display section 9 as shown in step S39. The process then returns to step S31.

In the thumbnail images displayed through the display section 9 in step S32, if the images are 3D shot images, one of each pair of images is displayed by adding information such as "R" or "L". In this case, when an image to be played back is selected by operating the touch panel 8 as shown in FIG. 11, the pair of left and right images is automatically transmitted to the FMD 26 if a communication can be established in step S36, thereby enabling the user 25 to have 3D appreciation through the FMD 26.

In the above-described present embodiment, when the user 25 holds the two cameras 2A and 2B by his/her two hands, the left-right placement relationship between the two cameras 2A and 2B can be determined by determining whether or not a right finger holds the camera at a predetermined finger position closer to the right end of the case 3a or 3b.

The left-right relationship between the two images shot by the image pickup sections 5a and 5b of the two cameras 2A and 2B respectively can be determined by determining the left-right placement relationship between the two cameras 2A and 2B. Therefore two items of information on the pair of left and right images obtained by 3D shooting can be respectively recorded according to the determination result when the shot two images are recorded.

Also in displaying in left and right positions two images recorded by 3D shooting so that the images can be easily seen three-dimensionally, the images can be easily displayed left and right so as to be easily observed three-dimensionally because the information on the right image and the left image is recorded. Thus, the convenience (operability) facilitating the user 25 to check the conditions of the two images before 3D shooting can be improved and image management or the like is made easier.

Also, in the present embodiment, the camera disposed on the right-hand side, i.e., one of the two cameras held by the right hand 26a, is operated as a main camera to perform such control that the other camera is made to transmit a picked-up image and the main camera receives the transmitted image.

In the present embodiment, therefore, shooting of two images respectively picked up by the one and the other of the two cameras and having a left-right parallax, i.e., 3D shooting, can be easily performed by the release operation on the one camera. In this case, the release operation is performed only on the one camera; the need for the release operation on the other camera is eliminated, thereby enabling 3D shooting to be easily performed.

Also, 3D shooting can be performed while easily changing the left-right parallax by adjusting the distance in the left-right direction between the two hands holding the two cameras 2A and 2B.

Also, in the present embodiment, an image picked up by one of the two cameras and an image picked up by the other camera can be displayed through the display section of the one of the two cameras by being placed (arranged) left and right according to the left-right determination result, so that the user can easily check the two images.

Also, in the present embodiment, the functions to display two images through the display section and determine by comparison whether or not 3D shooting can be satisfactorily or properly performed are provided, so that the user can easily perform 3D shooting.

Embodiment 2

Figure 14:
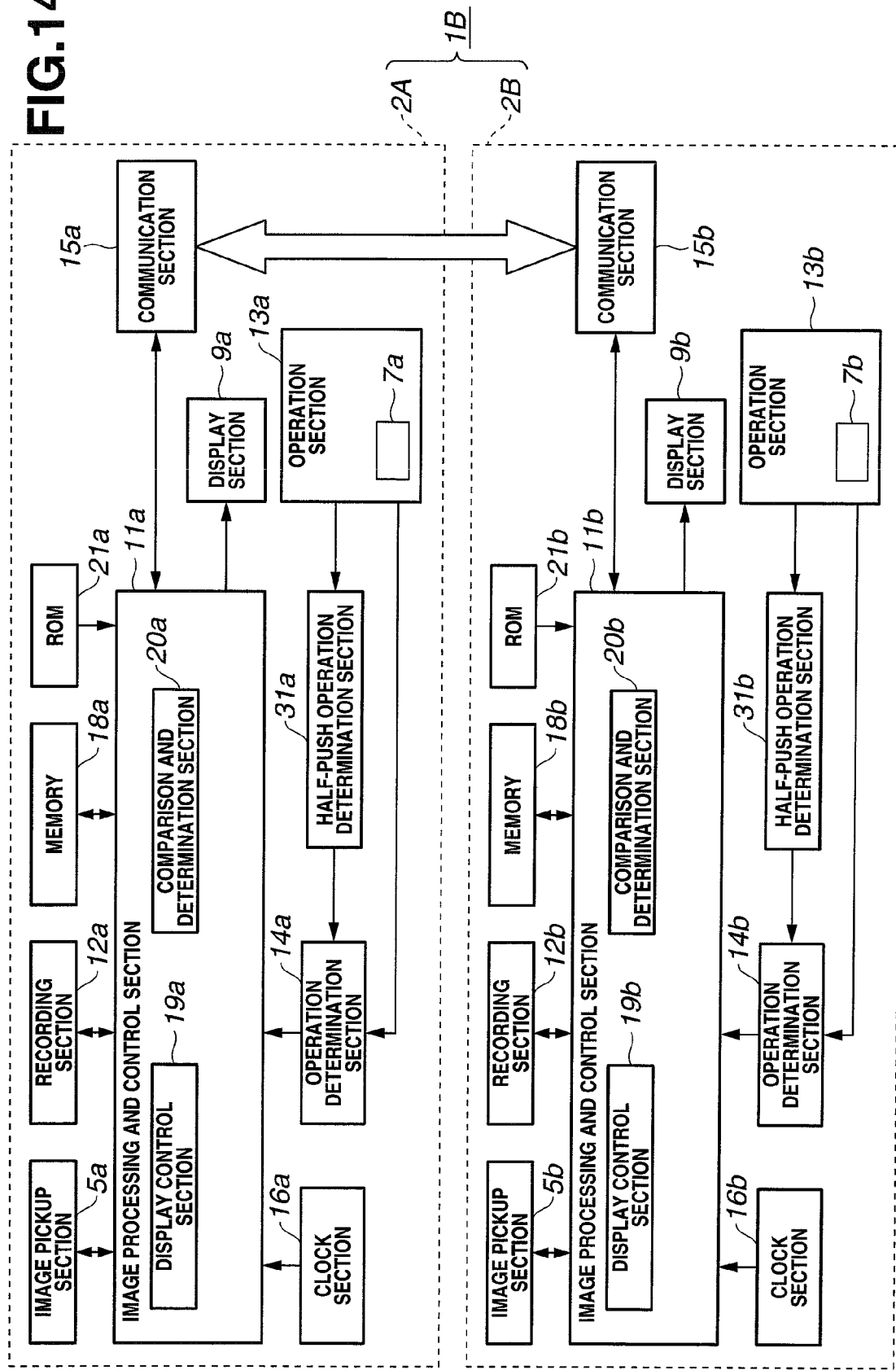
FIG. 14 is a block diagram showing the configuration of a shooting system provided with Embodiment 2 of the present invention.

Embodiment 2 of the present invention will be described. FIG. 14 shows a shooting system 1B according to Embodiment 2 of the present invention. This shooting system 1B is of a configuration not including the finger position determination sections 17a and 17b using the touch panels 8a and 8b in the shooting system 1 shown in FIG. 1C.

This shooting system 1B has, in place of the finger position determination sections 17a and 17b, release half-push operation determination sections (referred to simply as "half-push operation determination sections") 31a and 31b which determine release half-push operations on release buttons 7a and 7b. Each of the release buttons 7a and 7b is constituted by a two-step switch which is turned from an off state into an on state in two steps by a pressing operation. Turning from an off state into an on state in the first step corresponds to the release half-push operation, and turning from an off state into an on state in the second step corresponds to the release operation.

Results of determination made by the half-push operation determination sections 31a and 31b are sent to the image processing and control sections 11a and 11b through the operation determination sections 14a and 14b.

The half-push operation determination sections 31a and 31b have the function to determine that, when the half-push operation is performed by the user 25, the camera on which the operation is performed is the camera disposed on the right-hand side in the two cameras 2A and 2B. That is, in the present embodiment, the half-push operation determination sections 31a and 31b have the function of the determination section 82 in FIG. 1A to determine the left-right placement relationship between the two cameras 2A and 2B held by the two hands.

Since the release buttons 7a and 7b are disposed at right-hand positions on the cases 3a and 3b of the cameras 2A and 2B as described above, the operability of the cameras can be improved if the camera held by the right hand 26a is operated as a main camera; the release operation is performed on the main camera; and the need for the release operation on the camera held by the left hand 26b is eliminated.

Also the configuration in the present embodiment secures such operability.

In the present embodiment, 3D shooting mode determination in Embodiment 1 is not made before the release half-push operation is performed. The image processing and control sections 11a and 11b of the cameras 2A and 2B are each capable of selecting the image pickup mode when powered on.

When the image pickup mode is selected, the image processing and control sections 11a and 11b of the cameras 2A and 2B pick up images, display the picked up images and perform control for setting the communication sections 15a and 15b in a state of being able to perform communication, as described below.

When the release half-push operation on the release button 7a or 7b is performed by the user 25, the half-push operation determination section 31a or 31b of the camera on which the release half-push is performed determines the camera as the main camera 2A disposed on the right-hand side, and the subsequent control process for performing 3D shooting is started.

In other respects, the configuration is the same as that of the shooting system 1 shown in FIG. 1C. In FIG. 14 (also in FIG. 18 referred to below), the result display control sections 29a and 29b in the display control sections 19a and 19b are omitted.

The control process for 3D shooting in the present embodiment will now be described with reference to FIG. 15.

By powering on, the control process in the cameras 2A and 2B is started. In first step S41, determination is made as to whether or not the power supply is turned off. If the power supply is turned off, this process ends.

If the result of determination is that the power supply is not off, each of the cameras 2A and 2B determines as shown in step S42 whether or not the operation for the shooting mode has been performed.

If the result of determination is that the camera is not in the shooting mode, determination in step S43 as to whether playback is to be performed is made and processing for playback in step S44 is performed. Steps S43 and S44 are the same as steps S5 and S6 in FIG. 8.

In the case of determining in step S42 that the present mode is the shooting mode, the cameras 2A and 2B respectively perform processings for image pickup and display as shown in Step S45. In this case, the cameras 2A and 2B respectively perform image pickup by the image pickup sections 5a and 5b and display picked-up images through the display sections 9a and 9b.

In subsequent step S46, the cameras 2A and 2B respectively turn on the power supplies for the communication sections 15a and 15b to enable communication.

Further, in subsequent step S4 7, each of the cameras 2A and 2B determines whether or not the release half-push operation has been performed.

As described above, the two cameras 2A and 2B have the release buttons 7a and 7b disposed at right-hand positions in the upper surfaces of the cases 3a and 3b, and the operability is improved if the release button of the camera held by the right hand 26a is operated for the release operation for performing 3D shooting.

Figure 16:
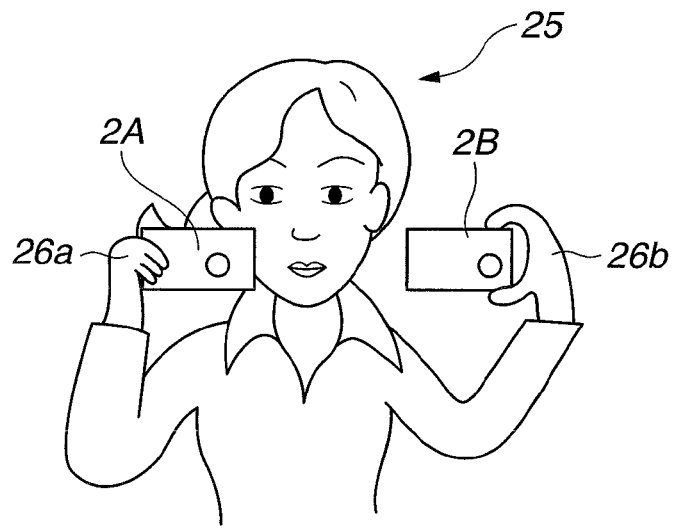
FIG. 16 is a diagram showing a state in which a user holds two cameras by his/her two hands to perform three-dimensional shooting.
Figure 17:
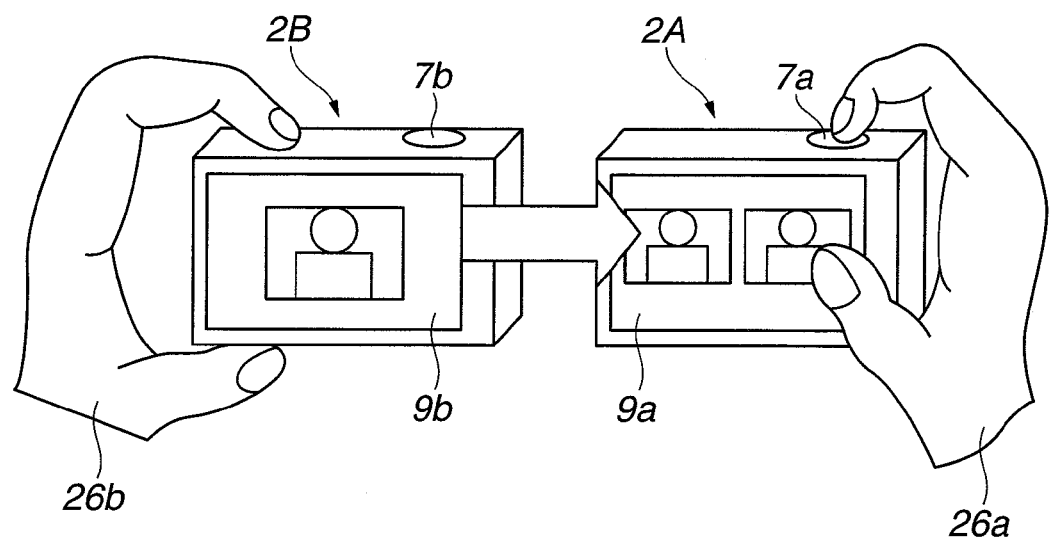
FIG. 17 is a diagram showing a state in which in the case shown in FIG. 16 the release button of the camera held by the right hand is half-pushed immediately before three-dimensional shooting.

FIG. 16 shows a state in which the user 25 is holding the two cameras 2A and 2B. FIG. 17 shows a state in which the release button 7a of the camera 2A held by the right hand 26a is half-pushed by the right finger. The half-push operation determination section 31 a of the camera 2A determines the release half-push operation in step S47 and sends the determination result to the image processing and control section 11a.

From this determination result, the image processing and control section 11a thereafter sets the camera 2A that has first outputted this determination result in a state for performing the control process as the main camera disposed on the right-hand side. Also in the following description, the camera 2A is described as a main camera and the other camera 2B is described as a sub camera.

After step S47, the main camera 2A requests communication between the cameras as shown in step S48. More specifically, this communication request is, for example, an image transmission request signal sent from the main camera 2A to the sub camera 2B to make a request for transmission of an image picked up by the sub camera 2B (first signal in FIG. 1B).

As shown in step S49, the sub camera 2B determines whether or not the sub camera 2B has been requested communication (transmission) from the main camera 2A. If the sub camera 2B does not determine any communication request, the process returns to step S41.

In the case of determining the communication request, the sub camera 2B transmits an image picked up by the sub camera 2B as shown in step S50.

Control may be performed so that the exposure control signal for display shown in step S11 in FIG. 8 is transmitted from the main camera 2A to the sub camera 2B together with the communication request signal and the exposure in the sub camera 2B is adjusted to that in the main camera 2A. After step S50, the process returns to step S41. On the other hand, the main camera 2A determines as shown in step S51 whether or not the image transmitted from the sub camera 2B has been received. If the image cannot be received, the process moves to step S55.

In the case of determining in step S51 that image has been received, the main camera 2A displays the two images through the display section 9a by correctly placing the images left and right as shown in step S52. The processing from step S52 to step S59 is the same as the processing from step S14b to step S21 shown in FIG. 8.

For example, in the case of the existence of the received image, processing for displaying the two images by correctly placing the images left and right in step S52, processing for image comparison and determination as to 3D shooting OK in step S53, processing for displaying "3D display OK" in step S54 and processing for determining the release operation in step S55 are performed. Also, when the release operation is performed, processing for shooting in step S56 is performed and determination as to the existence/nonexistence of the received image is performed in step S57. In the case of the existence of the received image, the same recording as that in step S20 in FIG. 8 is performed in step S58.

In the case of the nonexistence of any received image, each of the main cameras 2A and 2B individually performs image recording according to the release operation as shown in step S59.

In the present embodiment, the release half-push operation on the release button 7a or 7b for performing the release operation is utilized to determine the camera held in the right hand 26a by the user 25 in the two cameras 2A and 2B, and the camera held by the right hand 26a is set as a main camera disposed on the right-hand side.

Also, a transmission request is sent from this camera to the other camera to receive the image picked up by the other camera, thus enabling 3D shooting to be easily performed.

Therefore, means for determining the left-right placement relationship between the two cameras 2A and 2B in the present embodiment differs from that in Embodiment 1 but the present embodiment has substantially the same effects and advantages as those of Embodiment 1. A point of difference in terms of effect from Embodiment 1 resides in that the means for detecting the finger position in Embodiment 1 is not required.

That is, in the present embodiment, the left-right placement relationship between the two cameras 2A and 2B is determined from the release half-push operation. By this determination, the left-right relationship between two images respectively shot by the image pickup sections 5a and 5b of the two cameras 2A and 2B is settled. Therefore, when the two shot images are recorded, information on the right image and information on the left image can be respectively recorded according to the determination result.

Also in the case of displaying the recorded two images left and right so that the images can be easily seen three-dimensionally, the information on the right image and the left image is recorded. Therefore, displaying the images left and right can be easily performed so that three-dimensional appreciation of the images is easier.

In other words, management of images is made easier and the convenience is also improved.

Also, in the present embodiment, the camera disposed on the right-hand side, i.e., one of the two cameras held by the right hand 26a, is operated as a main camera to perform such control that the other camera is made to transmit a picked-up image and the main camera receives the transmitted image.

In the present embodiment, therefore, shooting of two images respectively picked up by the one and the other of the two cameras and having a left-right parallax, i.e., 3D shooting, can be easily performed by the release operation on the one camera. In this case, the release operation is performed only on the one camera; the need for the release operation on the other camera is eliminated, thereby enabling 3D shooting to be easily performed.

Also, 3D shooting can be performed while easily changing the left-right parallax by adjusting the distance in the left-right direction between the two hands holding the two cameras 2A and 2B.

Also, in the present embodiment, an image picked up by one of the two cameras and an image picked up by the other camera can be displayed through the display section of the one of the two cameras by being placed (arranged) left and right according to the left-right determination result, so that the user 25 can easily check the two images before 3D shooting.

Also, in the present embodiment, the functions to display two images through the display section and determine by comparison whether or not 3D shooting can be satisfactorily or properly performed are provided, so that the user can easily perform 3 D shooting.

Embodiment 3

Figure 18:
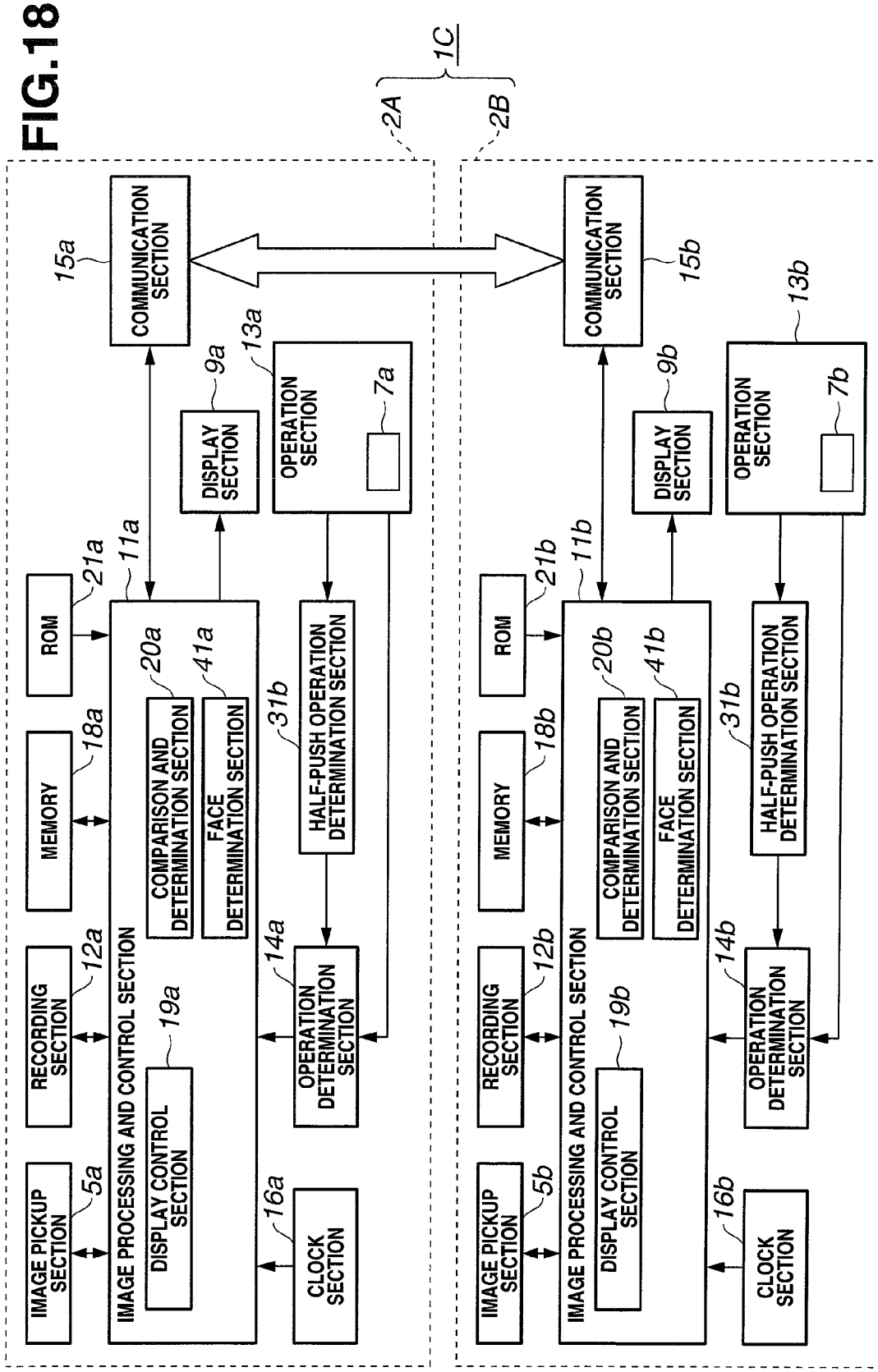
FIG. 18 is a block diagram showing the configuration of a shooting system having Embodiment 3 of the present invention.

Embodiment 3 of the present invention will be described. A shooting system 1C according to Embodiment 3 of the present invention shown in FIG. 18 is such that, in the shooting system IB shown in FIG. 14, the image processing and control sections 11a and 11b further make determination as to extraction of a main subject and, if the main subject is a human figure, the image processing and control sections 11a and 11b have face determination sections 41a and 41b which determine the face of the human figure.

Each of the comparison and determination sections 20a and 20b in the image processing and control sections 11a and 11b determines whether or not 3D shooting is effective by comparing the determined face with an image of the face transmitted from the other camera. In the present embodiment, the camera recognized as a main camera from determination of release half-push transmits a signal for image transmission request to a sub camera, as does that in Embodiment 2. However, this image transmission request is a request for transmission of image data on a portion of an image including the face of a main subject picked up by the sub camera 2B.

That is, in the present embodiment, determination as to whether or not 3D shooting can be satisfactorily performed is made by receiving only image data on a portion of a main subject without receiving data on the entire image picked up by the sub camera 2B as in Embodiment 1 or 2. (Needless to say, in this case, the sub camera 2B transmits the image data on the portion of the picked-up image.)

In the present embodiment, the load on communication between the two cameras 2A and 2B can be reduced by reducing the amount of data on an image transmitted from the sub camera 2B to the main camera 2A in the above-described way. Also, in the present embodiment, frame drops or the like at the time of transmission and reception of an image can be reduced by reducing the load on communication.

In the present embodiment, because the main camera 2A receives image data on only a portion of an image picked up by the sub camera 2B, the main camera 2A records an image shot by the main camera 2A and sends a shooting command (shooting request) to the sub camera 2B when the release operation is performed.

The sub camera 2B records the image shot by the sub camera 2B. In this case, the main camera 2A controls the sub camera 2B so that the sub camera 2B records the image by adding left image information, as described below. In other respects, the configuration is the same as that of Embodiment 2.

A process for camera control in the present embodiment will be described with reference to FIG. 19.

Processing from step S41 to step S47 in FIG. 19 in which determination is made as to whether or not release half-push has been made is the same as the corresponding processing in FIG. 15, and the description for this processing will not be repeated.

The main camera 2A on which release half-push has been made makes a request for communication between the cameras as shown in step S48. The main camera 2A sends to the sub camera 2B a request for transmission of an image picked up by the sub camera 2B, as does that in Embodiment 2.

In the present embodiment, however, the request is for transmission of not the entire data on the image picked up by the sub camera 2B but only image data on a portion such as a central portion including a face in the image.

The sub camera 2B on which release half-push has not been made determines in step S49 whether or not the communication request has been made, as in the case of the process shown in FIG. 15. If the communication request has not been made, the process returns to step S41.

In the case of determining that the communication request has been made, the sub camera 2B further determines in subsequent step S61 whether or not a shooting request has been made. Since no shooting request has been made at this stage, in subsequent step S62 the sub camera 2B transmits to the main camera 2A image data on a portion including a face in the image picked up by the sub camera 2B. The process then returns to step S41.

Figure 20:
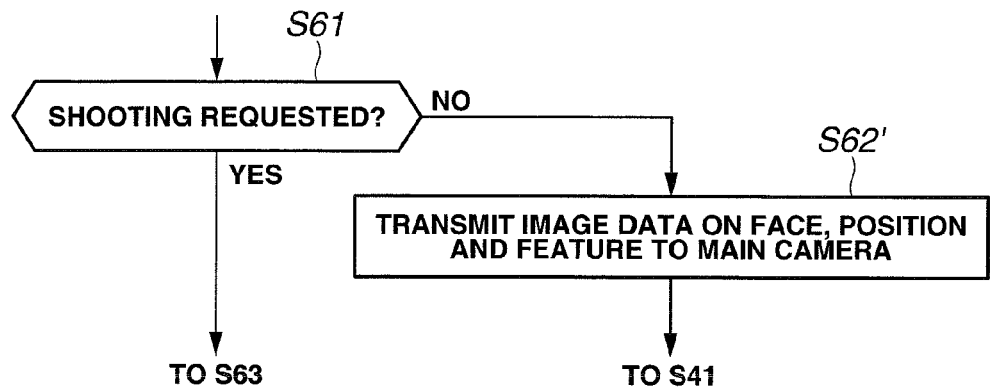
FIG. 20 is a diagram showing contents of processing in a modified example of step S62 in FIG. 19.

Step 62' shown in FIG. 20 may be performed in place of step S62 to transmit image data including a position and features of the face.

When in step S61 a shooting command is transmitted from the main camera 2A in step S72 described below, the sub camera 2B determines the shooting request (corresponding to this shooting command) in step S61 and performs shooting in step S63. Further, in step S64, the sub camera 2B records the image picked up by the sub camera 2B and adds and records information for the left image in 3D shooting.

After step S64, the process returns to step S41.

On the other hand, the main camera 2A determines in step S65 subsequent to step S48 whether or not the image (image data on a portion including a face) has been received. If the main camera 2A determines that the image has not been received, the process moves to step S69" If the image has been received, the process advances to subsequent step S66.

In step S66, the main camera 2A compares the image picked up from the same subject by the main camera 2A with features of the image picked up by the sub camera 2B. That is, in subsequent step S67, the main camera 2A compares images of a featured face and determines whether or not 3D shooting is effective.

Figure 21:
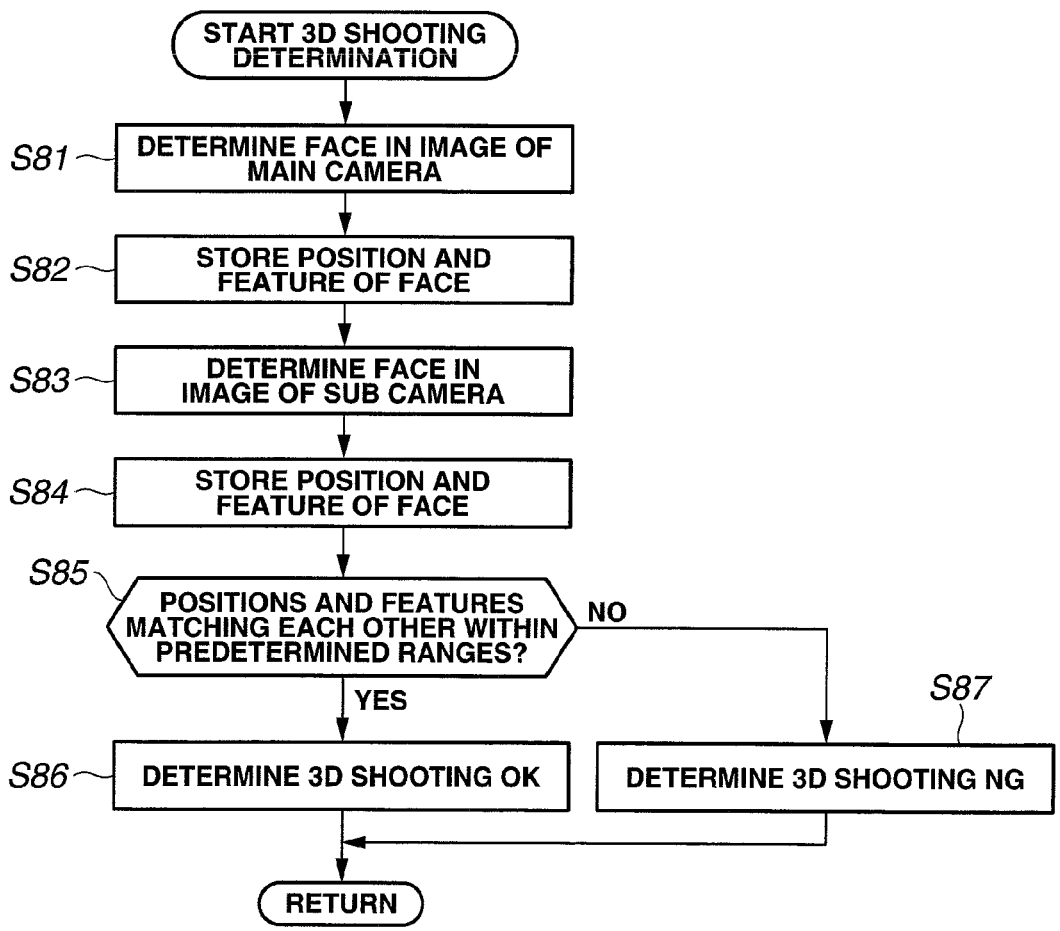
FIG. 21 is a flowchart showing a processing procedure for three-dimensional shooting determination made to determine whether or not three-dimensional shooting is effective.

Processing for determination as to whether or not 3D shooting is effective in the present embodiment will be described below with reference to FIG. 21.

In the case of determining in step S67 that 3D shooting is effective, the main camera 2A displays "3D shooting, OK" in subsequent step S68 and determines in step S69 whether or not the release command operation has been performed.

In the case of determining in step S69 that the release operation has not been performed, the process returns to step S41. If the release command operation has been performed, the main camera 2A performs shooting in subsequent step S70.

In subsequent step S71, the main camera 2A determines whether or not communication with the sub camera 2B is being continued, in other words, whether or not the cameras are in the communicating state.

In the case of determining that the cameras are in the communicating state, the main camera 2A transmits a shooting command to the sub camera 2B in subsequent step S72. In this case, if the sub camera 2B records the image (the left image in this case), the main camera 2A also transmits a signal for addition of information on the left image in 3D shooting. The main camera 2A may also send a command to record information for identifying the main camera 2A forming the pair.

In step S73 subsequent to step S72, the main camera 2A records in the recording section 12a the image picked up by the image pickup section 5a. When recording this image (right image), the main camera 2A records in the recording section 12a information on the right image in 3D shooting by adding the information to the image. The main camera 2A also records information for identification of the sub camera 2B recording the left image and for identification of the left image. The process then returns to step S41.

As described above, when the sub camera 2B determines transmission of a shooting command from the main camera 2A as a shooting request in step S61, the sub camera 2B performs shooting in step S63 and recording in step S64.

In the case of determining in step S71 that the cameras are not in the communicating state, the main camera 2A records the image picked up by the image pickup section 5a in the recording section 12a in step S74. Processing in steps S66 and S67 for 3D shooting determination as to whether or not 3D shooting is effective will be described with reference to FIG. 21.

When 3D shooting determination processing for determining whether or not 3D shooting is effective is started, the image processing and control section 11a of the main camera (right camera) 2A (the face determination section 41a in the image processing and control section 11a) determines a main subject in the image picked up by the image pickup section 5a and determines a face if the main subject is a human figure, as shown in step S81.

In subsequent step S82, the image processing and control section 11a (the face determination section 41a) stores, for example, in the memory 18a, the position and features of the face determined in step S81. In subsequent step S83, the image processing and control section 11a (the face determination section 41a) determines the face from image data on a portion including the face transmitted from the sub camera (left camera) 2B in the case where the main subject is a human figure. Further, in subsequent step S84, the image processing and control section 11a (the face determination section 41a) stores positions and features in the face.

If, as in step S62' in FIG. 20, the image processing and control section 11b of the sub camera 2B (the face determination section 41b in the image processing and control section 11b) determines a face and transmits image data to the main camera 2A as a result of determination of positions and features in the face, step S83 may be omitted.

In step S85, the image processing and control section 11a determines whether or not the position and features of the face by the main camera 2A determined in step S82 and the position and features of the face by the sub camera 2B determined in step S83 coincide with each other within predetermined ranges.

Figure 22:
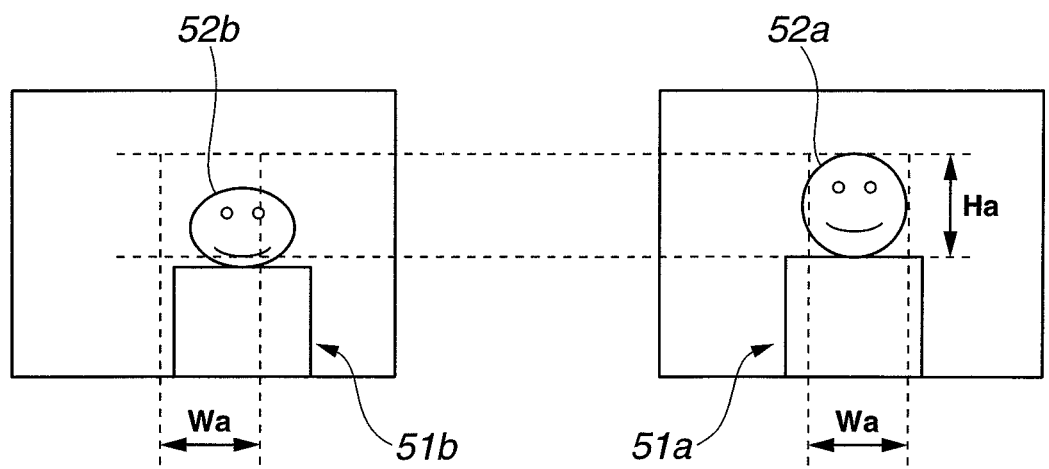
FIG. 22 is a diagram showing a state in which positions or the like of a face of a human figure as a main subject in two images picked up by a pair of left and right cameras are compared with each other.

FIG. 22 shows faces 52a and 52b in a main subject 51 a picked up by the main camera 2A and a main subject 51 b picked up by the sub camera 2B.

If in step S85 the positions in the left-right direction (horizontal direction), the positions in the height direction (vertical direction), the sizes and other values of the faces 52a and 52b have amounts of difference within predetermined ranges, the image processing and control section 11a determines "3D shooting OK" as shown in step S86. The 3D shooting determination processing shown in FIG. 21 then ends and the process advances to step S68 in FIG. 19.

FIG. 22 shows a state in which a size Wa in the left-right direction and a size Ha in the height direction of the face 52a and the positions of the sizes, obtained by the main camera 2A, and corresponding positions on the face 52b side, obtained by the sub camera 2B, are compared with each other by setting on the face 52b side the positions defined in the face 52a.

With respect to the case shown in FIG. 22, it is determined that there are amounts of difference in the left-right and height directions, and that the amount of difference between the sizes in the height direction is large.

If in step S85 the positions in the left-right direction, the positions in the height direction, the sizes and other values of the faces 52a and 52b have amounts of difference exceeding predetermined ranges, the image processing and control section 11a determines that 3D shooting is not effective, that is, "3D shooting NG" as shown in step S87. This 3D shooting determination processing then ends and the process advances to step S69 in FIG. 19.

As described above, in the present embodiment, a configuration for determining whether or not 3D shooting is effective by using only a main image portion in picked-up images is adopted and, therefore, the load on the communication section and the burden on 3D shooting determination processing can be reduced.

In other respects, the present embodiment has substantially the same effects and advantages as those of Embodiment 2.

Figure 23:
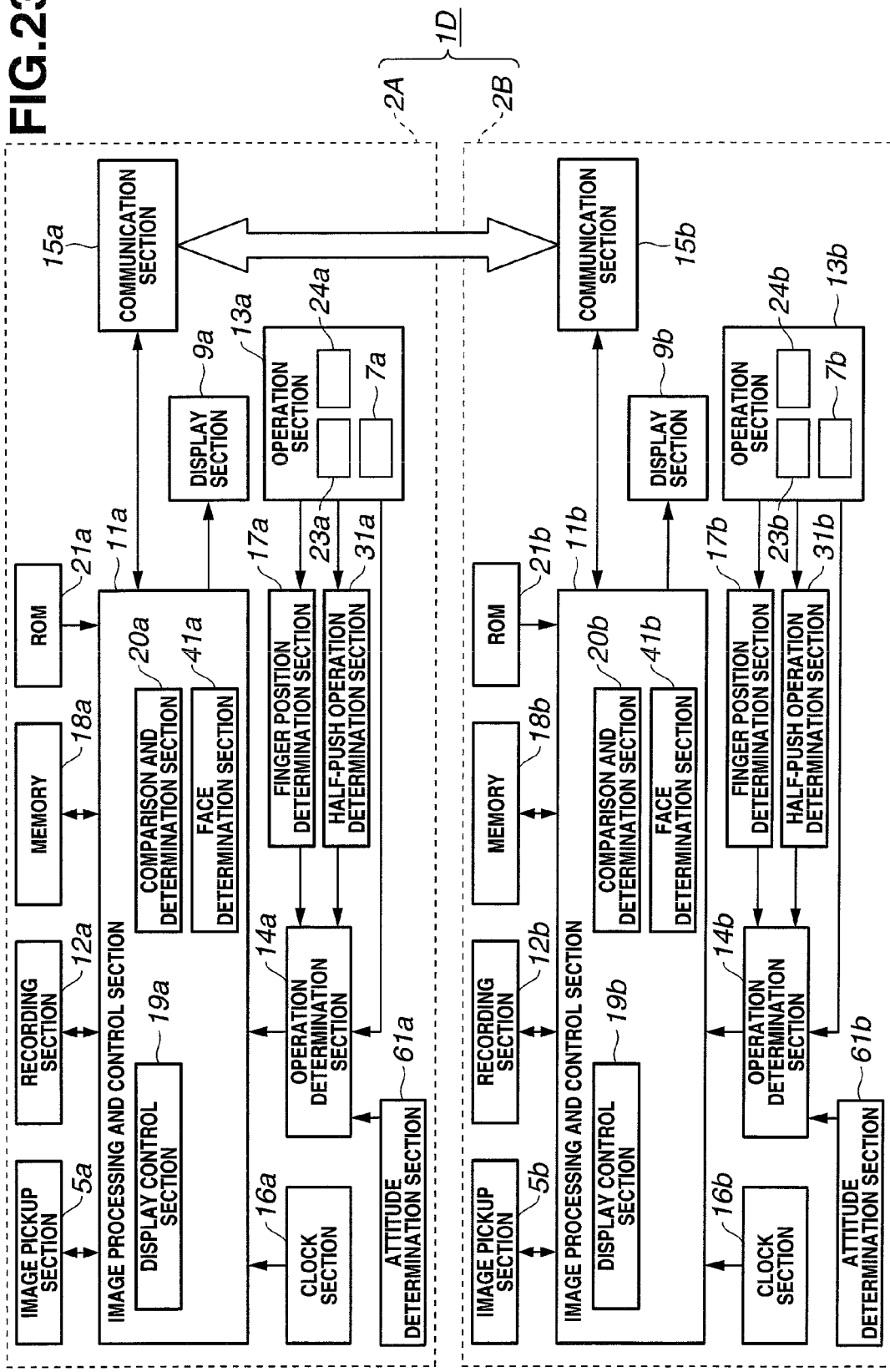
FIG. 23 is a block diagram showing the configuration of a shooting system provided with a modified example of Embodiment 3.

A modified example of the present embodiment will be described. FIG. 23 shows the configuration of a shooting system 1D provided with the modified example. The shooting system 1D is such that, for example, the shooting system 1C shown in FIG. 18 is further provided with the finger position determination sections 17a and 17b in Embodiment 1 and attitude determination sections 61a and 61b.

Determination results from the finger position determination sections 17a and 17b and determination results from the half-push operation determination sections 31a and 31b are sent to the image processing and control sections 11a and 11b through the operation determination sections 14a and 14b.

In Embodiments 1, 2, and 3, it is assumed that the user 25 holds the cameras in the state of setting the landscape frame.

Figure 24:
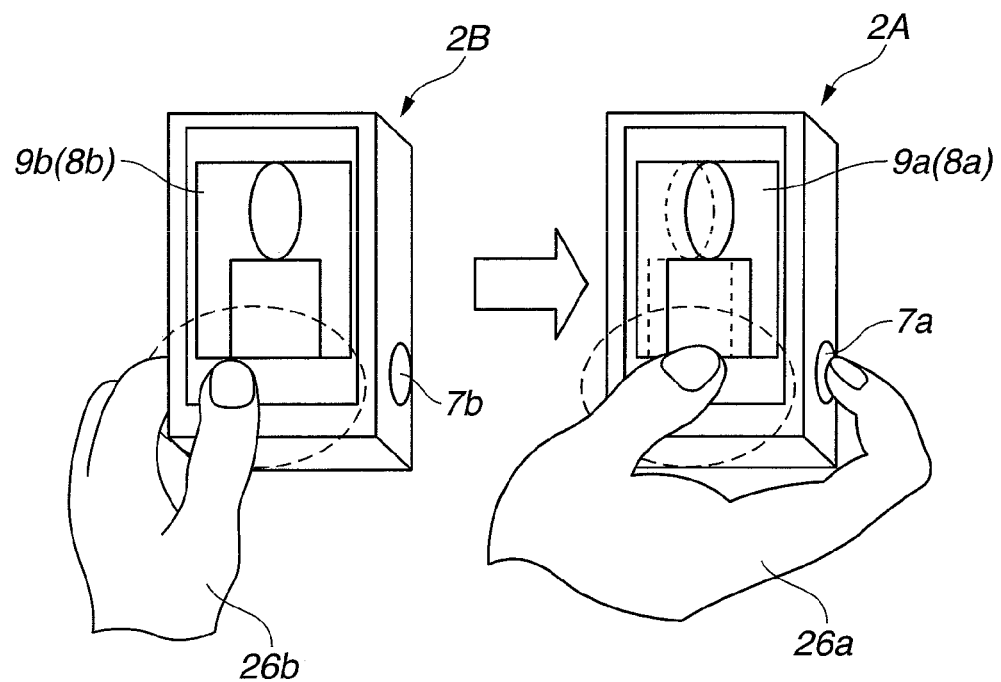
FIG. 24 is a diagram showing a state in which a user holds two cameras setting a portrait frame.

In some case, however, the user 25 holds the two cameras 2A and 2B in the state of setting the portrait frame as shown in FIG. 24.

In the present embodiment, therefore, the attitude determination sections 61a and 61b perform attitude determination as to whether the state of the two cameras held by the user 25 corresponds to the landscape frame and setting of the release buttons 7a and 7b at upper positions or to the portrait frame and setting of the release buttons 7a and 7b at right side positions.

The attitude determination sections 61a and 61b can determine whether the held cameras 2A and 2B are in an attitude for the landscape frame or in an attitude for the portrait frame, for example, by using a sensor capable of detecting the direction of gravity.

Also, the state corresponding to the portrait frame may be determined by means of the touch panels 8a and 8b in Embodiment 1 when as shown in FIG. 24 both the right hand 26a and the left hand 26b hold the cameras 2A and 2B at the right finger position shown in FIG. 4. That is, it is possible to form the attitude determination sections 61a and 61b by using the touch panels 8a and 8b.

On the basis of the results of attitude determination made by the attitude determination sections 61a and 61b, the operation determination sections 14a and 14b perform control for selection between adopting the results of determination from the finger position determination sections 17a and 17b and adopting the results of determination from the half-push operation determination sections 31a and 31b.

More specifically, in the case of determination of the attitude for the portrait frame by attitude determination, the camera disposed on the right-hand side is determined as a main camera from the release half-push operation, as in Embodiment 3.

On the other hand, in the case of determination of the attitude for the landscape frame, the camera disposed on the right-hand side is determined as a main camera from the result of determination of a hold on the touch panel 8a or 8b at the predetermined position, as in Embodiment 1.

Also, the display control section 19a performs control for generating a portrait/landscape signal for vertically displaying an image in the case of the portrait frame or horizontally displaying an image in the case of the landscape frame and control for designating display positions according to the result of determination made by the operation determination section 14a.

That is, the display control section 19a has a function of a portrait and landscape image display control section with (display) position designation. In other respects, the configuration is the same as that of the shooting system 1C shown in FIG. 18.

Figure 25:
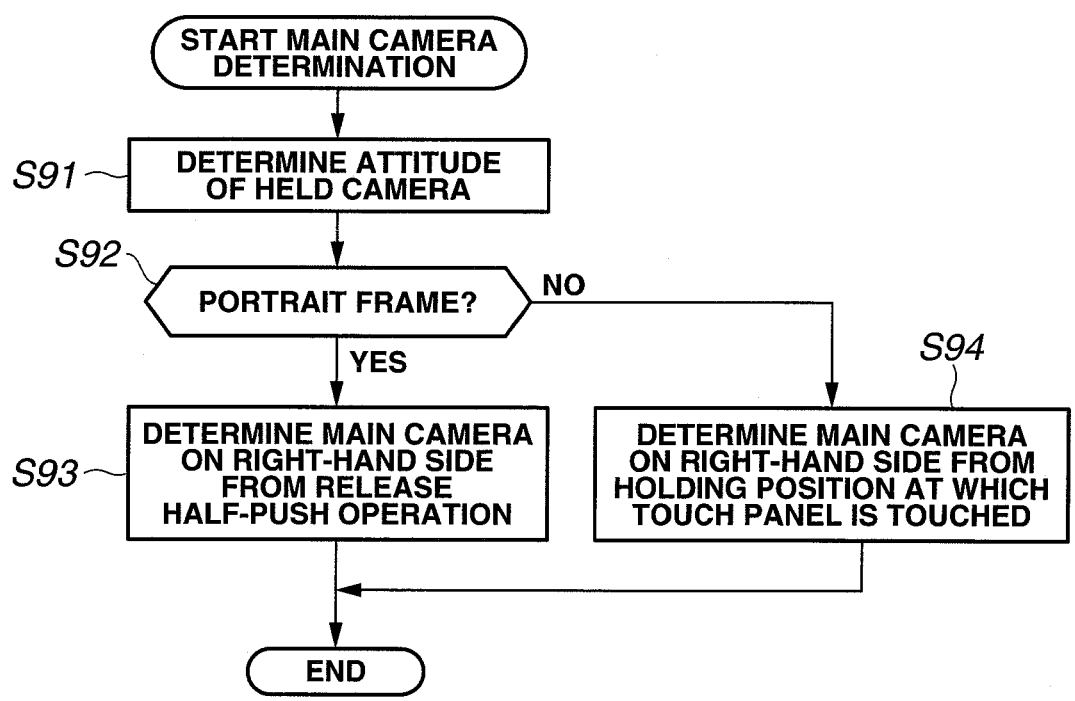
FIG. 25 is a flowchart showing contents of main camera determination processing for determining a main camera in the modified example.

FIG. 25 shows contents of processing for main camera determination or attitude determination.

In first step S91, the attitude determination sections 61a and 61b determine the attitudes of the two cameras 2A and 2B held. From the results of this determination, determination is made in step S92 as to whether or not the portrait frame is set.

In the case of determination of the portrait frame, determination is made from the release half-push operation to recognize the camera disposed on the right-hand side as a main camera, as shown in FIG. 24. In this case, 3D shooting can be performed by the camera control method shown in FIG. 19. 3D shooting may be performed by the camera control method shown in FIG. 15 with respect to Embodiment 2.

In the case of the portrait frame, however, two images or portions of the two images are not displayed left and right when determination is made as to whether or not 3D shooting can be satisfactorily performed.

In the case of the portrait frame, when the image picked up by the sub camera 2B or a portion of the image is transmitted to the main camera 2A, the image is displayed in a superimposed manner as shown in FIG. 10 or 24. In FIG. 24, an example of display of a main subject is illustrated.

If the portrait frame is not determined in step S92, the camera disposed on the right-hand side is determined as a main camera from the finger position at which the touch panel 8a or 8b is held or touched.

In this case, 3D shooting can be performed by the camera control method shown in FIG. 8.

According to the present modified example, the user can perform 3D shooting in a state where good operability is secured when the landscape frame is set as well as when the portrait frame is set.

The embodiments and the modified examples have been described with respect to a case where the release buttons 7a and 7b are disposed at right-hand positions in the upper surfaces of the cases 3a and 3b of the cameras 2A and 2B.

However, cameras having the release buttons 7a and 7b disposed at left-hand positions in the upper surfaces of the cases 3a and 3b for left-handed users are also conceivable. In such cameras, higher operability can be secured if the release command operation is performed by the left hand 26b.

In this case, the same effects and advantages as those described above in a state where the operability is high can be obtained according to a description made by substituting "the camera disposed on the left-hand side" in the above description of setting (or determination) of a main camera.

For example, the description of Embodiment 1 can be rewritten as follows. The finger position determination section 17b determines the camera 2B held by the left hand 26b as the camera disposed on the left-hand side. This camera is operated as a main camera. If communication between the cameras can be performed, the image processing and control section 11 b performs control for transmitting an exposure control signal for display to the other camera 2A.

When an image picked up by this camera 2A is transmitted to the camera 2B as a main camera, the camera 2B receives the image and displays the two images by correctly placing the images left and right through the display portion 9b. In this case, the image obtained by the main camera is displayed by being placed on the left-hand side, while the image obtained by the sub camera is displayed by being placed on the right-hand side.

When the release operation is performed on the camera 2B by the user 25, the camera 2B records the two images in the recording section 12b and also records information on the left-right image placement. Thus, the same effects and advantages as those described with respect to right-handed users can also be realized for left-handed users.

The above-described embodiments and the like can be implemented by providing, for example, the ROMs 21a and 21 b as storage sections for control programs in the existing cameras or shooting apparatuses having the function of the communication section 15a.

The embodiments and the like can also be implemented by writing the control programs in recording sections in the existing cameras or shooting apparatuses instead of providing the ROMs 21a and 21b.

According to the above description, 3D shooting can be performed by holding the two cameras 2A and 2B by two hands. However, 3D shooting may be performed in a different ways, for example, by fixing the sub camera on a tripod or the like disposed on the left-hand side relative to the right hand after determination of the main camera held by the right hand, instead of holding the sub camera by the left hand. In this case, 3D shooting can be performed by further increasing the left-right parallax.

The present invention has been described with respect to the cameras 2A and 2B identical in configuration to each other. However, the present invention can be applied to a combination of different cameras. In such a case, it is preferable that each of the two cameras has, as a basic configuration, at least the configuration shown in FIG. 1A.

If a main camera and a sub camera determined in advance are used, the present invention can also be applied to even a case where not both the process for controlling the main camera and the process for controlling the sub camera are provided.

Other embodiments or the like configured, for example, by combining portions of the above-described embodiments and the like also belong to the present invention. Other configurations modified without departing from the gist of the present invention also belong to the present invention. For example, the means for detecting the finger position when the user 25 holds the camera in Embodiment 1 is not limited to the configuration using the touch panels 8a and 8b. For example, pressure sensors or contact sensors or the like for detecting a pressure or contact at the time of holding may be provided in the vicinities of the right end and the left end of the back surfaces of the cases 3a and 3b.

Figure 26A:
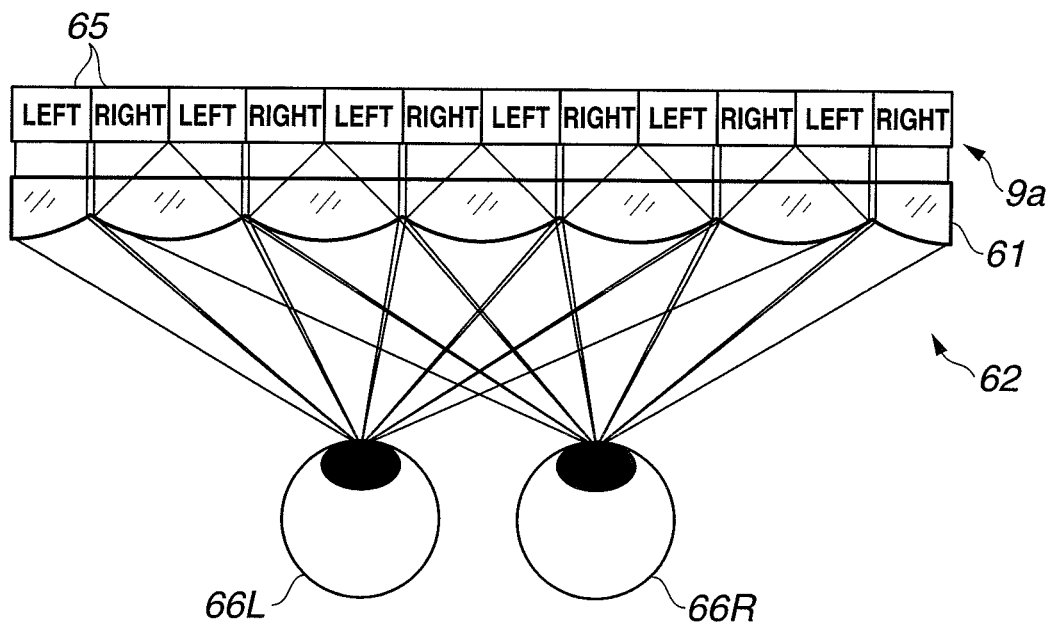
FIGS. 26A and 26B are diagrams showing configurations for displaying left and right images so that the images are 3D-observable with the naked eyes.
Figure 26B:
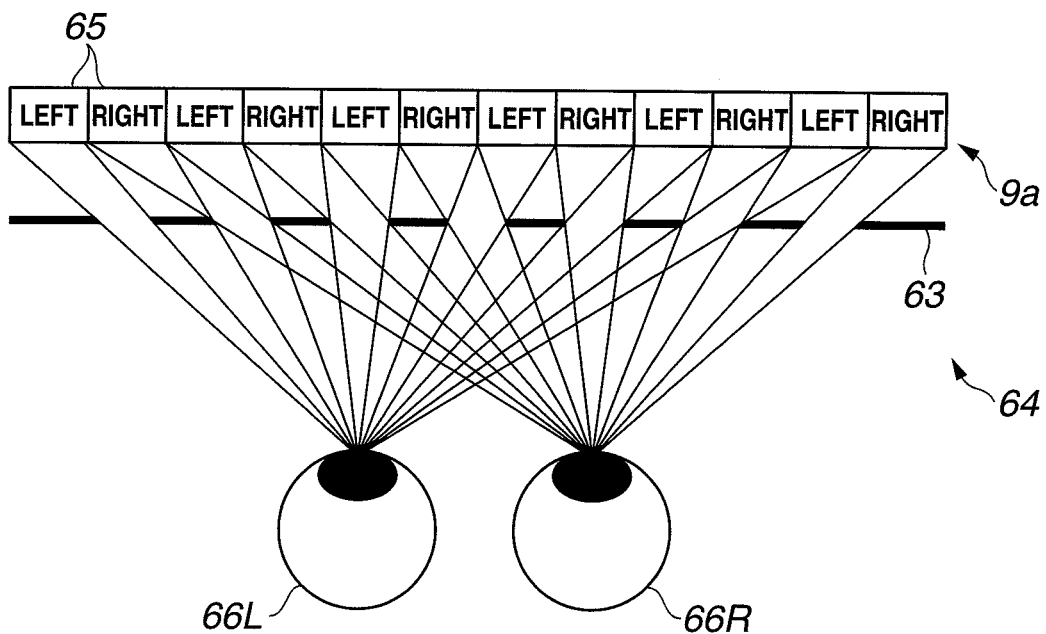

As described above with respect to Embodiment 1 and the like, 3D display using, for example, a 3D-capable display device (e.g., a liquid crystal display device for 3D display) provided on one of the two cameras may be performed as well as display of images placed left and right. FIGS. 26A and 26B show examples of configurations for producing displays 3D-observable with the naked eyes.

FIG. 26A shows a 3D-capable display device 62 having in front of the display section 9a a lens in plate form called a lenticular lens 61. FIG. 26B shows a 3D capable display device 64 having in place of the lenticular lens 61 a vertically-striped filter (aperture grill) called a parallax barrier 63.

As shown in FIGS. 26A and 26B, left and right images for one frame (or one field) are displayed on one display section 9a in such a manner that unit groups of left pixels and unit groups of right pixels (indicated as "LEFT" and "RIGHT" in FIGS. 26A and 26B), each consisting of 65 pixels, are alternately arranged as left pixels, right pixels, left pixels, right pixels and so on. When the user 25 sees the images displayed on the display section 9a through the lenticular lens 61 or the parallax barrier 63 placed in front of the display section 9a, each of a left eye 66L and a right eye 66R observes only the left pixels or the right pixels (the left image or the right image as a whole).

Advantageously, use of such a display device 62 or 64 enables 3D observation without requiring any special spectacles.

What is claimed is:

1. A shooting apparatus comprising:
   an image pickup section which performs image pickup;
   a display section which displays an image picked up by the image pickup section;
   a release button which enables a two-step operation including a half-push operation and a full-push operation;
   an operation determination section which determines whether the operation is the half-push operation or full-push operation; and
   a communication section which performs communication for requesting communication with another shooting apparatus different from the shooting apparatus through the half-push operation with the release button, and performs communication for requesting shooting condition data by the other shooting apparatus.

2. The shooting apparatus according to claim 1, wherein the shooting condition data includes data on at least a portion of the image picked up by the other shooting apparatus.

3. The shooting apparatus according to claim 1, wherein the shooting condition data includes data that indicates an attitude when shooting is performed.

4. The shooting apparatus according to claim 1, wherein the shooting condition data includes data that indicates that the shooting apparatus is a main camera.

5. The shooting apparatus according to claim 1, wherein the communication section performs communication for requesting, as the shooting condition data, feature data of the image picked up by the other shooting apparatus.

6. The shooting apparatus according to claim 1, wherein the communication section performs communication for requesting a portion of the image picked up by the other shooting apparatus.

7. The shooting apparatus according to claim 1, wherein the communication section performs communication for requesting, as the shooting condition data, data on a position where a portion of the image exists.

8. The shooting apparatus according to claim 1, wherein the communication section further performs communication for transmitting exposure data that controls exposure of the other shooting apparatus.

9. The shooting apparatus according to claim 1, further comprising a control section which performs control so as to cause the exposure of the other shooting apparatus to match the exposure of the shooting apparatus through communication by the communication section.

10. The shooting apparatus according to claim 5, wherein the communication section performs communication for requesting, as the feature data, image data of a face of a subject.

11. The shooting apparatus according to claim 1, wherein the communication section comprises a wireless communication section which wirelessly performs communication.

12. A shooting control method using communication between a first shooting apparatus and a second shooting apparatus, the method comprising:
   a first step of, when a release button provided in the first shooting apparatus and enabling a two-step operation including a half-push operation and a full-push operation is operated, determining whether the half-push operation or the full-push operation has been performed;
   a second step in which, if the first step determines that the half-push operation has been performed, the first shooting apparatus requests communication with the second shooting apparatus, and performs communication to request shooting condition data of the second shooting apparatus;
   a third step in which, if the first step determines that the full-push operation has been performed, the first shooting apparatus performs shooting and transmits a shooting command to the second shooting apparatus.

13. The shooting control method according to claim 12, wherein the shooting condition data requested in the second step includes data on at least a portion of the image picked up by the second shooting apparatus.

14. The shooting control method according to claim 12, wherein the shooting condition data requested in the second step includes data that indicates an attitude when shooting is performed.

15. The shooting control method according to claim 12, wherein the shooting condition data requested in the second step includes data that indicates that the shooting apparatus is a main camera.

16. The shooting control method according to claim 12, wherein the second step performs communication for requesting, as the shooting condition data, feature data of the image picked up by the other shooting apparatus.

17. The shooting control method according to claim 16, wherein the second step performs communication for requesting, as the feature data, image data of a face of a subject.

18. The shooting control method according to claim 16, wherein the first, second and third steps perform wireless communication using a wireless communication section.

19. The shooting control method according to claim 12, wherein the second step further performs communication for transmitting exposure data that controls exposure of the second shooting apparatus.

\* \* \* \* \*